(12) United States Patent
Pyeon

(10) Patent No.: US 8,493,808 B2
(45) Date of Patent: Jul. 23, 2013

(54) DATA FLOW CONTROL IN MULTIPLE INDEPENDENT PORT

(75) Inventor: Hong Beom Pyeon, Ottawa (CA)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 0 days.

(21) Appl. No.: 13/418,478

(22) Filed: Mar. 13, 2012

(65) Prior Publication Data

US 2012/0170395 A1 Jul. 5, 2012

Related U.S. Application Data

(63) Continuation of application No. 12/851,884, filed on Aug. 6, 2010, now Pat. No. 8,159,893, which is a continuation of application No. 12/034,686, filed on Feb. 21, 2008, now Pat. No. 7,796,462.

(60) Provisional application No. 60/910,107, filed on Apr. 4, 2007, provisional application No. 60/891,124, filed on Feb. 22, 2007.

(51) Int. Cl.
*G11C 7/00* (2006.01)

(52) U.S. Cl.
USPC ....... 365/219; 365/221; 365/189.05; 365/154

(58) Field of Classification Search
USPC ............ 365/219, 221, 233.1, 230.08, 189.05, 365/63, 51, 154; 710/60–64, 305–307, 110; 714/724, 726
See application file for complete search history.

(56) References Cited

U.S. PATENT DOCUMENTS

| | | | |
|---|---|---|---|
| 4,174,536 | A | 11/1979 | Misunas et al. |
| 4,733,376 | A | 3/1988 | Ogawa |
| 4,796,231 | A | 1/1989 | Pinkham |
| 4,816,996 | A | 3/1989 | Hill et al. |
| 4,899,316 | A | 2/1990 | Nagami |
| 5,038,299 | A | 8/1991 | Maeda |
| 5,126,808 | A | 6/1992 | Montalvo et al. |

(Continued)

FOREIGN PATENT DOCUMENTS

| | | |
|---|---|---|
| WO | 0169411 A2 | 9/2001 |
| WO | 0209405 A2 | 1/2002 |

OTHER PUBLICATIONS

Samsung Electronics Co. Ltd., 256 M×8 BIT/ 128M×16 BIT/ 512M×8 BIT NAND Flash Memory, K9K4G08U1M, K9F2G08U0M, K9F2G16U0M, Revision 1.0, 1-41, May 6, 2005.

(Continued)

*Primary Examiner* — David Lam
(74) *Attorney, Agent, or Firm* — Shuji Sumi

(57) ABSTRACT

A system includes a memory controller and a plurality of memory devices connected in-series that communicate with the memory controller. Each of the memory devices has multiple independent serial ports for receiving and transmitting data. The memory controller a device address (DA) or ID number for designating a device that executes a command. Data contained in the command sent by the memory controller is captured by an individual link control circuit, in response to internally generated clock with appropriate latencies. The captured data is written into a corresponding memory bank. The data stored in one of a plurality of memory banks of one memory device is read in accordance with the addresses issued by the memory controller. The read data is propagated from the memory device through the series-connected memory devices to the memory controller.

15 Claims, 21 Drawing Sheets

U.S. PATENT DOCUMENTS

| | | |
|---|---|---|
| 5,136,292 A | 8/1992 | Ishida |
| 5,168,556 A | 12/1992 | Lajtai et al. |
| 5,175,819 A | 12/1992 | Le Ngoc et al. |
| 5,243,703 A | 9/1993 | Farmwald et al. |
| 5,280,539 A | 1/1994 | Yeom et al. |
| 5,365,484 A | 11/1994 | Cleveland et al. |
| 5,404,460 A | 4/1995 | Thomsen et al. |
| 5,440,694 A | 8/1995 | Nakajima |
| 5,452,259 A | 9/1995 | McLaury |
| 5,473,563 A | 12/1995 | Suh et al. |
| 5,473,566 A | 12/1995 | Rao |
| 5,473,577 A | 12/1995 | Miyake et al. |
| 5,596,724 A | 1/1997 | Mullins et al. |
| 5,602,780 A | 2/1997 | Diem et al. |
| 5,636,342 A | 6/1997 | Jeffries |
| 5,671,178 A | 9/1997 | Park et al. |
| 5,721,840 A | 2/1998 | Soga |
| 5,740,379 A | 4/1998 | Hartwig |
| 5,761,146 A | 6/1998 | Yoo et al. |
| 5,771,199 A | 6/1998 | Lee |
| 5,802,006 A | 9/1998 | Ohta |
| 5,818,785 A | 10/1998 | Ohshima |
| 5,828,899 A | 10/1998 | Richard et al. |
| 5,835,935 A | 11/1998 | Estakhri et al. |
| 5,859,809 A | 1/1999 | Kim |
| 5,872,994 A | 2/1999 | Akiyama et al. |
| 5,937,425 A | 8/1999 | Ban |
| 5,941,974 A | 8/1999 | Babin |
| 5,959,930 A | 9/1999 | Sakurai |
| 5,995,417 A | 11/1999 | Chen et al. |
| 6,002,638 A | 12/1999 | John |
| 6,085,290 A | 7/2000 | Smith et al. |
| 6,091,660 A | 7/2000 | Sasaki et al. |
| 6,107,658 A | 8/2000 | Itoh et al. |
| 6,128,703 A | 10/2000 | Bourekas et al. |
| 6,144,576 A | 11/2000 | Leddige et al. |
| 6,148,364 A | 11/2000 | Srinivasan et al. |
| 6,178,135 B1 | 1/2001 | Kang |
| 6,304,921 B1 | 10/2001 | Rooke |
| 6,317,350 B1 | 11/2001 | Pereira et al. |
| 6,317,352 B1 | 11/2001 | Halbert et al. |
| 6,371,350 B2 | 4/2002 | Gonnet et al. |
| 6,438,064 B2 | 8/2002 | Ooishi |
| 6,442,098 B1 | 8/2002 | Kengeri |
| 6,510,487 B1 | 1/2003 | Raza et al. |
| 6,535,948 B1 | 3/2003 | Wheeler et al. |
| 6,584,303 B1 | 6/2003 | Kingswood et al. |
| 6,594,183 B1 | 7/2003 | Lofgren et al. |
| 6,601,199 B1 | 7/2003 | Fukuda et al. |
| 6,611,466 B2 | 8/2003 | Lee et al. |
| 6,658,582 B1 | 12/2003 | Han |
| 6,680,904 B1 | 1/2004 | Kaplan et al. |
| 6,715,044 B2 | 3/2004 | Lofgren et al. |
| 6,732,221 B2 | 5/2004 | Ban |
| 6,754,807 B1 | 6/2004 | Parthasarathy et al. |
| 6,763,426 B1 | 7/2004 | James et al. |
| 6,769,039 B2 | 7/2004 | Shiraishi |
| 6,807,103 B2 | 10/2004 | Cavaleri et al. |
| 6,816,933 B1 | 11/2004 | Andreas |
| 6,850,443 B2 | 2/2005 | Lofgren et al. |
| 6,853,557 B1 | 2/2005 | Haba et al. |
| 6,853,573 B2 | 2/2005 | Kim et al. |
| 6,928,501 B2 | 8/2005 | Andreas et al. |
| 6,944,697 B2 | 9/2005 | Andreas |
| 6,950,325 B1 | 9/2005 | Chen |
| 6,967,874 B2 | 11/2005 | Hosono |
| 6,983,406 B2 * | 1/2006 | Porterfield ..................... 714/726 |
| 6,996,644 B2 | 2/2006 | Schoch et al. |
| 7,073,022 B2 | 7/2006 | El-Batal et al. |
| 7,161,842 B2 | 1/2007 | Park |
| 7,308,524 B2 | 12/2007 | Grundy et al. |
| 7,379,376 B2 | 5/2008 | Oh et al. |
| 7,397,717 B2 | 7/2008 | Chen et al. |
| 7,539,909 B2 | 5/2009 | LeClerg et al. |
| 7,593,279 B2 | 9/2009 | Wolford et al. |
| 7,796,462 B2 * | 9/2010 | Pyeon ..................... 365/230.08 |
| 8,159,893 B2 * | 4/2012 | Pyeon ..................... 365/219 |
| 2002/0087708 A1 | 7/2002 | Low et al. |
| 2003/0074505 A1 | 4/2003 | Andreas et al. |
| 2004/0001380 A1 | 1/2004 | Becca et al. |
| 2004/0019736 A1 | 1/2004 | Kim et al. |
| 2004/0024960 A1 | 2/2004 | King et al. |
| 2004/0039854 A1 | 2/2004 | Estakhri et al. |
| 2004/0148482 A1 | 7/2004 | Grundy et al. |
| 2004/0199721 A1 | 10/2004 | Chen |
| 2004/0230738 A1 | 11/2004 | Lim et al. |
| 2004/0256638 A1 | 12/2004 | Perego et al. |
| 2005/0120163 A1 | 6/2005 | Chou et al. |
| 2005/0160218 A1 | 7/2005 | See et al. |
| 2005/0166006 A1 | 7/2005 | Talbot et al. |
| 2005/0213421 A1 | 9/2005 | Polizzi et al. |
| 2006/0031593 A1 | 2/2006 | Sinclair |
| 2007/0041255 A1 | 2/2007 | Jeddeloh |

OTHER PUBLICATIONS

"2GBIT (256×8 BITS) CMOS NAND E2PROM", TH58NVG1S3AFT05, Toshiba MOS Digital Integrated Circuit Silicon Gate CMOS, 1-32, May 19, 2003.

64 Megabit CMOS 3.0 Volt Flash Memory With 50MHZ SPI (Serial Peripheral Interface) BUS Data Sheet (Preliminary) Publication No. S25FL064A, 1-32, Sep. 6, 2006.

Kennedy, Joseph et al, "A 2GB/S Point to Point Heterogeneous Voltage Capagle DRAM Interface for Capacity-Scalable Memory Subsystems" ISSCC 2004/ Session 1/ DRAM/ 11.8, IEEE International Solid-State Circuits Conference, 1-10, Feb. 15, 2004.

Kim, Jae-Kwan et al, "A 3.6GB/S/Pin Simultaneous Bidirectional (SBD) I/O Interface for High-Speed DRAM" ISSCC 2004/Session 22/DSL and Multi-GB/s I/O 22.7, IEEE International Solid-State Circuits Conference, 1-8, Feb. 15, 2004.

Gjessing, S. et al, A RAM Link for High Speed, Special Report/ Memory, IEEE Spectrum, 52-53, Oct. 1, 1992.

King, Craig, L. et al, Communicating With Daisy Chained MCP42XXX Digital Potentiometers Microchip AN747, 1-8, Jan. 30, 2001.

"DDR2 Fully Buffered Dimm 240 Pin Fbdimms Based on 512 MB C-DIE" (ROHS Compliant) Rev. 1.3, 1-32, Sep. 1, 2006.

M-Systems Flash Disk Pioneers Ltd., "Diskonchip H1 4GB (512 Mbyte) and 8 GB (1 Gbyte) High Capacity Flash Disk With NAND and ×2 Technology" Data Sheet, Rev. 0.5 (Preliminary), 1-66, Jan. 1, 2005.

Tal, Arie, "Guidelines for Integrating Diskonchip in a Host System" Application Note, AP-DOC-1004, Rev. 1.0, 1-15, Aug. 1, 2004.

Oshima, Y. et al, High-Speed Memory Architectures for Multimedia Applications—Meeting the Requirements of Higher Performance, Circuits and Devices, IEEE 8755-3996/97, 8-13, Jan. 1, 1997.

High Speed Small Sectored SPI Flash Memory 4M (524,288.8) AT25FS040 Advance Information, 1-23, Sep. 1, 2006.

Hypertransport TM I/O Link Specification, Revision 2.00b, Document No. HTC20031217-0036-0010, Hyperstransport Technology Consortium, 1-325, Apr. 27, 2005.

Hypertransport TM I/O Link Specification, Revision 3.00, Document No. HTC20051222-0046-0008, Hyperstransport Technology Consortium, 1-428, Apr. 21, 2006.

IEEE Standard for High-Bandwidth Memory Interface Based on Scalable Coherent Interface (SCI) Signaling Technology (RAMlink), IEEE Std. 1596.4-1996, The Institute of Electrical Electronics Engineers, Inc., 1-98, Mar. 19, 1996.

Intel Advanced Boot Block Flash Memory (C3), 28F800C, 28F160C3, 28F320C3(16) Datasheet Product Features Order No. 290645, Revision: 023, 1-72, May 1, 2005.

Raouf, Ali Ahmed, "International Patent Application No. PCT/CA2007/002183, Search Report", 1-65, Apr. 7, 2008.

Samsung Electronics, "Onenand 4G (KFW4G16Q2M-DEB6), Onenand 2G (KFH2G16Q2M-DEB6, Onenand 1G (KFW1G16Q2M-DEB6)" Flash Memory, OnenandTM Specification Ver. 1.2, 1-125, Dec. 23, 2005.

Gjessing, Stein, Performance of the RAMlink Memory Architecture, Proceedings of the Twenty-Seventh Annual Hawaii International Conference on System Sciences, IEEE 1060-3425/94, 154-162, Jan. 1, 1994.

Gjessing, Stein et al, Ramlink: A High-Bandwidth Point-To-Point Memory Architecture, Proceedings COMPCOM 1992, IEEE 0-8186-2655-0/92, 328-331, Feb. 24, 1992.

Gjessing, S. et al, "RAMlink: A High-Bandwidth Point-To-Point Memory Architecture" Proceedings of the Twenty-Seventh Annual Hawaii International Conference on System Sciences, IEEE 1060-3424/94, p. 154-162, 154-162, Jan. 4, 1994.

Diamond, Steven L., Synclink: High-Speed Dram for the Future, Micro Standards, IEEE Micro, 74-75, Dec. 1, 1996.

* cited by examiner

Command Set

| Operation | Command (2 Bytes) | | Row Address (3 Bytes) | Column Address (2 Bytes) | Input Data (1 to 2112 Bytes) |
|---|---|---|---|---|---|
| | DA (1 Byte) | OP Code (1 Byte) | | | |
| Page Read | Valid | 0Xh | Valid | - | - |
| Page Read for Copy | Valid | 1Xh | Valid | - | - |
| Burst Data Read | Valid | 2Xh | - | Valid | - |
| Burst Data Load Start | Valid | 4Xh | - | Valid | Valid |
| Burst Data Load | Valid | 5Xh | - | Valid | Valid |
| Page Program | Valid | 6Xh | Valid | - | - |
| Block Erase Address Input | Valid | 8Xh | Valid | - | - |
| Page-pair Erase Address Input | Valid | 9Xh | Valid | - | - |
| Erase | Valid | AXh | - | - | - |
| Operation Abort | Valid | CXh | - | - | - |
| Read Device Status | Valid | D0h | - | - | - |
| Read Device Information Register | Valid | F1h | - | - | - |
| Write Link Configuration Register[2] | FFh | FFh | - | - | Valid (1 Byte Only) |

FIG. 13

DATA FLOW CONTROL IN MULTIPLE INDEPENDENT PORT

CROSS REFERENCE TO RELATED APPLICATIONS

This application is a continuation of U.S. patent application Ser. No. 12/851,884 filed on Aug. 6, 2010, now U.S. Pat. No. 8,159,893 issued on Apr. 17, 2012 which is a continuation of U.S. patent application Ser. No. 12/034,686 filed on Feb. 21, 2008, now U.S. Pat. No. 7,796,462 issued on Sep. 14, 2010 which claims the benefit of priority from U.S. Provisional Patent Application No. 60/891,124 filed Feb. 22, 2007 and U.S. Provisional Patent Application No. 60/910,107 filed on Apr. 4, 2007, the contents of which are expressly incorporated herein by reference in their entirety.

The present invention relates generally to data processing apparatus and method. More particularly, the present invention relates to an apparatus and method for capturing data to control data flow in series-connected semiconductor devices.

BACKGROUND

Current electronic equipment uses semiconductor devices, such as, for example, memory devices and data processing devices. For example, mobile electronic devices such as digital cameras, portable digital assistants, portable audio/video players and mobile terminals continue to require mass storage memories, such as non-volatile memory, with ever increasing capacities and speed capabilities. Non-volatile memory and hard-disk drives are often used since data is retained in the absence of power, thus extending battery life.

While existing memory devices operate at speeds sufficient for current electronic equipment, such memory devices may not be adequate for use in future electronic products and other products where high data rates are desired. For example, a mobile multimedia device that records high definition moving pictures is likely to require a memory module with a greater programming throughput than is available with current memory technology. While such a solution appears to be straightforward, there is a problem with signal quality at such high frequencies that sets a practical limitation on the operating frequency of the memory. The memory communicates with other components using a set of parallel input/output (I/O) pins, the number of which depends on the desired configuration. The I/O pins receive command instructions and input data and provide output data. This is commonly known as a parallel interface. High speed operation may cause communication degrading effects such as cross-talk, signal skew and signal attenuation, for example, which degrades signal quality.

In order to incorporate higher density and faster operation on the system boards, there are two design techniques possible: multi-drop and serial interconnection configurations. These design techniques may be used to overcome the density issue that determines the cost and operating efficiency of memory swapping between a hard disk and a memory system. However, multi-drop configurations have shortcomings relative to the serial interconnection of memory systems. For example, if the number of multi-drop memory systems increases, as a result of the loading effect of each pin, the delay time also increases so that the total performance of multi-drop is degraded by the multi-drop connection caused by the wire resistor-capacitor loading and the pin capacitance of the memory device. A serial link may provide a serial interconnection configuration to control command bits, address bits, and data bits effectively through the serial interconnection. In the serial interconnection configuration, each device is identified by a device identifier or a device address. Memory devices may be dynamic random access memories (DRAMs), static random access memories (SRAMs) and any type of flash memories.

For serial links operating at slow speeds in system applications, existing circuits for capturing data streams can be employed and result in acceptable performance. However, in the case of high speed operation, the correct data capturing from a serial port to assigned registers is not ensured in existing circuits because of fast clock operation during command interpretation.

SUMMARY

In accordance with one aspect of the present invention, there is provided a method for use in a memory device. The method comprises: receiving an input enable signal having an enable state and a disable state; while the input enable signal is in the enable state: receiving an input signal from external to the memory device; outputting an output signal that is an echo of the input signal; and while the input enable signal is in the disable state: outputting an output signal that is locally produced by the memory device, outputting an echo of the input enable signal.

The method may further comprise: receiving an output enable signal; outputting an echo of the output enable signal; receiving a chip select signal having an enable state and disable state; and while the chip select signal is in the disable state, disabling the outputting of any output signal.

In accordance with another aspect of the present invention, there is provided a memory device for use in an interconnection configuration including a plurality of memory devices connected in-series. The memory device comprises: a first input for receiving an input enable signal having an enable state and a disable state; a second input for receiving an input signal; a third input for receiving an output enable signal; a first output for outputting an output signal; a second output for outputting an echo of the input enable signal; a third output for outputting an echo of the output enable signal; a selector for, while the input enable signal is in the enable state, selecting the output signal to be an echo of the input signal, and while the input enable signal is in the disable state, selecting the output signal to be a locally produce signal.

The memory device may further comprise: a first buffer for buffering the input signal; a second buffer for buffering the input enable signal; and a third buffer for buffering the output enable signal.

In accordance with a further aspect of the present invention, there is provided a method for use in a semiconductor device, comprising: receiving a chip select signal to produce a local chip select signal; receiving a reset signal to produce a local reset signal; receiving a clock signal and a complement of the clock signal; forwarding the clock signal while both the local reset signal is in an enable state and the local chip select signal is in an enable state; forwarding the complement of the clock signal while both the local reset signal is in the enable state and the local chip select signal is in the enable state; and producing an internal clock from one of the forwarded clock signal and the forwarded complement of the clock signal.

For example, the semiconductor device is operable with an SDR (single data rate) clock. The step of producing comprises: generating an internal clock from one of the forwarded clock signal and the forwarded complement of the clock signal comprises generating a clock pulse in the internal clock for each rising transition of the forwarded clock signal.

In accordance with yet a further aspect of the present invention, there is provided an apparatus for controlling a semiconductor device. The apparatus comprises: a first input buffer for receiving and buffering a chip select signal to produce a local chip select signal; a second input buffer for receiving and buffering a reset signal to produce a local reset signal; a third input buffer for receiving and buffering a clock signal and forwards the clock signal while both the local reset signal is in an enable state and the local chip select signal is in an enable state; a fourth input buffer for receiving and buffering a complement of the clock signal while both the local reset signal is in an enable state and the local chip select signal is in an enable state; and an internal clock producer for producing an internal clock from one of the forwarded clock signal and the forwarded complement of the clock signal.

For example, the internal clock producer comprises a clock generator for, when the semiconductor device is operated with an SDR (single data rate), generating a clock pulse in the internal clock for each rising transition of the forwarded clock signal, and when the semiconductor device is operated with a DDR, generating a clock pulse in the internal clock for each rising transition of the forwarded clock signal and for each rising transition of the forwarded complement of the clock signal.

For example, in the SDR mode of operation, generating an internal clock from one of the forwarded clock signal and the forwarded complement of the clock signal comprises generating a clock pulse in the internal clock for each rising transition of the forwarded clock signal.

In accordance with yet a further aspect of the present invention, there is provided a method for producing a local output signal. The method comprises: to generate an output from core memory: receiving an output enable signal and a clock signal and generating a shifted clock and latch signal; and latching a locally produced parallel signal into a parallel-to-serial register using the latch signal and outputting contents of the parallel-to-serial register using the shifted clock, and to generate an output from a local register; receiving an output enable signal and a clock signal and generating a shifted clock and latch signal; and latching an output of the local register into a parallel-to-serial register using the latch signal and outputting contents of the parallel-to-serial register using the shifted clock.

In accordance with yet a further aspect of the present invention, there is provided an apparatus for producing a local output signal, comprising: a serial output controller for receiving an output enable signal and a clock signal and generates a shifted clock and latch signal; a first parallel-to-serial register for latching a locally produced parallel signal using the latch signal and outputs contents using the shifted clock; a second parallel-to-serial register for latching an output from a local register using the latch signal and outputs contents using the shifted clock; and a first selector for selecting between outputting the output of the first parallel-to-serial register and the second parallel-to-serial register.

In accordance with yet a further aspect of the present invention, there is provided a method comprising: receiving a chip select signal to produce a local chip select signal; receiving a reset signal to produce a local reset signal; receiving a clock signal and a complement of the clock signal; forwarding the clock signal while both the local reset signal is in an enable state and the local chip select signal is in an enable state; forwarding the complement of the clock signal while both the local reset signal is in the enable state and the local chip select signal is in the enable state; in a DDR (double data rate) mode of operation, generating an internal clock from both the clock signal and the complement of the clock signal.

For example, in the DDR mode of operation, generating an internal clock from both the forwarded clock signal and the forwarded complement of the clock signal comprises generating a clock pulse in the internal clock for each rising transition of the forwarded clock signal and for each rising transition of the forwarded complement of the clock signal.

In accordance with yet a further aspect of the present invention, there is provided a method in a memory device, the method comprising: receiving an input enable signal having an enable state and a disable state; receiving a input signal from external to the memory device; and outputting an output signal that is an echo of the input signal.

In accordance with yet a further aspect of the present invention, there is provided a memory device for use in an interconnection configuration, the device comprising: a receiver for receiving an input enable signal, a input signal and an output enable signal; and an output provider for outputting a serial output, an echo of the input enable signal and an echo of the output enable signal.

In accordance with yet a further aspect of the present invention, there is provided an apparatus for generating a locally produced output signal, the apparatus comprising: a serial output controller for receiving an output enable signal and a clock signal and generates a shifted clock and latch signal; a first register for latching a locally produced parallel signal using the latch signal and outputs contents using the shifted clock; a second register for latching an output from a local register using the latch signal and outputs contents using the shifted clock; and a selector for selecting between outputting the output of the first parallel-to-serial register and the second parallel-to-serial register.

In accordance with an embodiment of the present invention, there is provided system including a memory controller and a plurality of memory devices connected in-series that communicate with the memory controller. Each of the memory devices has a plurality of serial ports for receiving and transmitting commands and other information (e.g., address, data). The memory controller issues a device ID number for designating a device to execute the command. Data contained in the command from the memory controller is captured by an individual link control circuit, in response to internally generated clock with appropriate latencies. The captured data is written into a corresponding memory bank. The data stored in one of a plurality of memory banks of one memory device is read in accordance with the addresses issued by the memory controller. The read data is propagated from the memory device through the series-connected memory devices to the memory controller.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 13 is a table of an example command set for flash memory with modular command in byte mode;

DETAILED DESCRIPTION

Figure 1:
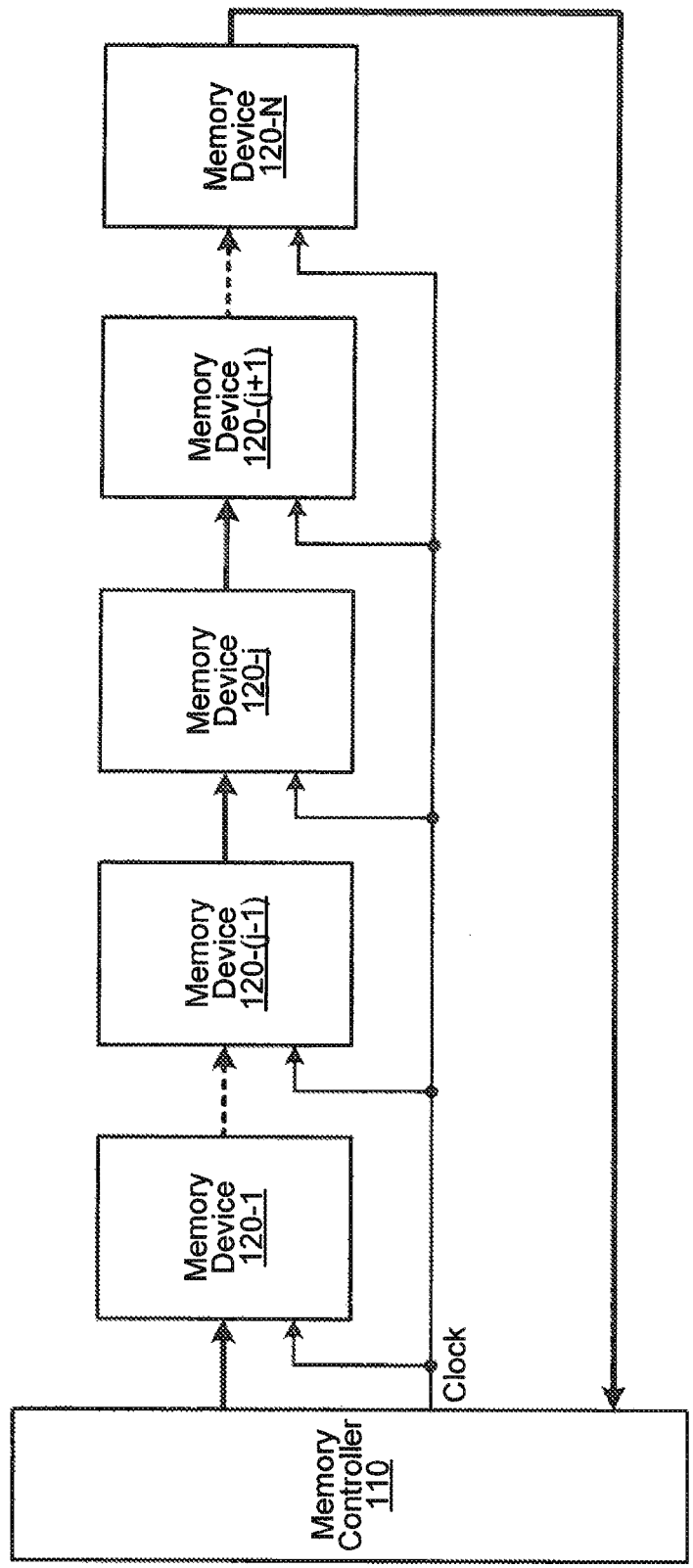
FIG. 1 shows a system to which embodiments of the present invention are applicable.

In the following detailed description of sample embodiments of the present invention, reference is made to the accompanying drawings which form a part hereof, and in which is shown by way of illustration specific sample embodiments in which the present invention may be practiced. These embodiments are described in sufficient detail to enable those of ordinary skill in the art to practice the present invention, and it is to be understood that other embodiments may be utilized and that logical, electrical, and other changes may be made without departing from the scope of the present invention. The following detailed description is, therefore, not to be taken in a limiting sense, and the scope of the present invention is defined by the appended claims.

Embodiments of the present invention will now be described in conjunction with an interconnection configuration having a plurality of semiconductor devices connected in-series. An interconnection configuration having a plurality of memory devices connected in-series enhances the operation performance of memory systems without necessarily changing core memory structure and relates specifically to interface and data processing circuitry. While particularly suitable for flash memory, it may find application with other memory types too. Due to the restriction of the flash cell structure and the fundamental low performance of the flash cell, the enhancement of flash performance has been a key issue to be resolved in the memory industry. Most products that include a flash memory core have parallel ports that simultaneously latch all address bits, all command bits, and all data bits. A serial link utilizes a single pin input for receiving all address, command, and data serially. Details of an interconnection configuration having a plurality of memory devices connected in-series are described in U.S. patent application Ser. No. 11/324,023 filed Dec. 30, 2005; U.S. Provisional Patent Application No. 60/787,710 entitled "Serial Interconnection of Memory Devices" filed Mar. 28, 2006; U.S. Provisional Patent Application No. 60/802,645 entitled "Serial Interconnection of Memory Devices" filed May 23, 2006; U.S. patent application Ser. No. 11/750,649 filed May 18, 2007; and U.S. patent application Ser. No. 11/567,551 entitled "Apparatus and Method for Capturing Serial Input Data" filed Dec. 6, 2006, the contents of all of which are entirely incorporated herein by reference.

An interconnection configuration having a plurality of semiconductor devices connected in-series provides input sequences that support diverse operation modes with a serial input port. In accordance with the type of command input, the byte length of following bit streams and total number of input bytes are varied. In the case of high speed operation, for example, over 200 MHz frequency, a temporary register can be used to hold bit data until command bit interpretation is completed, so as to allow the correct data capturing from a serial port to the assigned registers even with fast clock operation.

In order to capture data without losing a single bit of the serial input, the circuits that employ single clock control and fast logic to process command input before receiving the following bytes associated with the command are inappropriate due to the high speed operation required with very high frequency system applications.

An interconnection configuration having a plurality of memory devices connected in-series has a serial input and a serial output port. An output buffer transfers the command and address to a next device if they are combined together with an interconnection configuration. Similarly, the output buffer transfers any real data output results from memory core to the next device. In the case of data output from the memory core, a related output buffer is controlled by an output port enable (OPE) input signal while that buffer is enabled by an input port enable (IPE) signal for the forwarding of the command and address strings to a next device. This forwarding function is necessary for the interconnection configuration. However, even a single device can have a similar function thereby allowing the same control to be used for both a single device and an interconnection configuration.

A specific example of an interconnection configuration of the series-connected memories uses several serial-to-parallel registers to capture serial data and to make it grouped as byte based data for all input bit data streams. In the specific example, only a single serial input (SI) port pin receives commands, addresses, data according to the pre-defined input sequences in the form of serial data from a system. The interconnection configuration has more timing margin than the conventional way of bit data capture because the interconnection configuration implements simultaneous data capture and command interpretation with temporary registers and multiple internal clocks for address, data, and temporary registers.

FIG. 1 shows a system to which embodiments of the present invention are applicable. The system including a memory controller and an interconnection configuration of a plurality of devices connected in-series that are in communication with the memory controller. In the illustrated example, a memory controller 110 communicates with an interconnection configuration of N devices that are series-connected. The interconnection configuration includes a "first" memory device 120-1, - - - , a (j−1)-th memory device 120-(j−1), a j-th memory device 120-j, a (j+1)-th memory device 120-(j+1), - - - and a "last" (Nth) memory device 120-N, N being an integer greater than one, where 1≦j<N.

In the system shown in FIG. 1, during an initialization procedure, the devices of the interconnection configuration are assigned by device addresses or device identifiers by the memory controller 110. For example, devices addresses of consecutive numbers from low to high are generated and assigned to the devices 120-1 - - - 120-N. Each of the devices 120-1 - - - 120-N has its own address register (not shown) and the address register holds the assigned device address. After the device addresses are assigned to the devices 120-1 - - - 120-N, the memory controller 110 sends an access command and other information to control operations of the devices of the interconnection configuration to the first device 120-1 thereof, the operation including, for example, device address recognition and data processing. One of the data processing is to access a memory (not shown) included in each of the devices. For example, in the case of an access command being a write command, provided data is written into the memory of the target (or destined) device in accordance with the device address. In the case of an access command being a read command, the data of the memory is read in accordance with the memory address and the read data is transmitted to another device and forwarded to the memory controller 110. Examples of the device address assignment, the device address recognition and the data accessing are provided in U.S. Provisional Patent Application No. 60/787,710 filed Mar. 28, 2006; and U.S. Provisional Patent Application No. 60/802,645 filed May 23, 2006, the contents of which are entirely incorporated herein by reference.

Figure 2A:
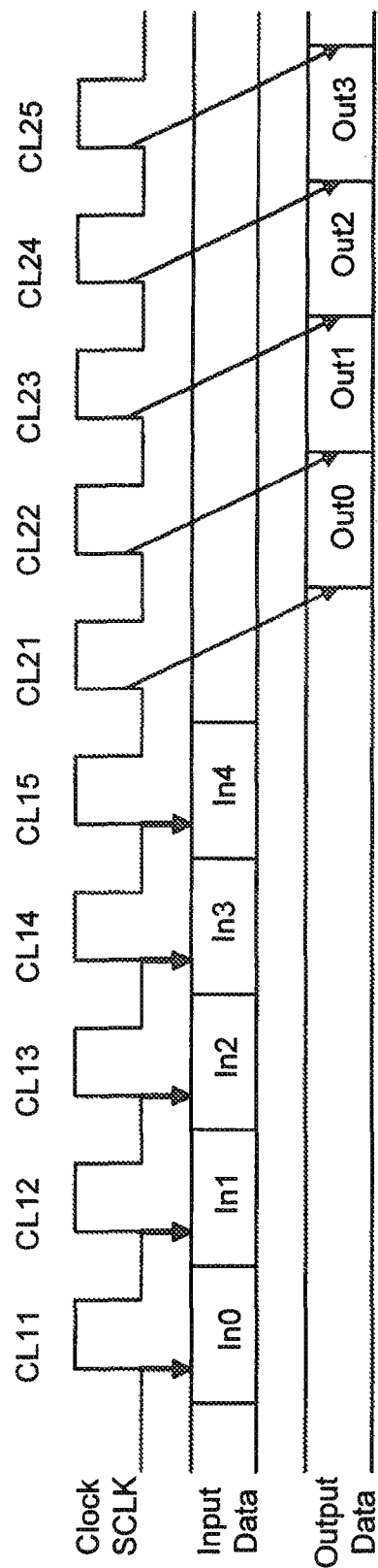
FIG. 2A illustrates a timing diagram of single data rate (SDR) operation of memory devices.
Figure 2B:
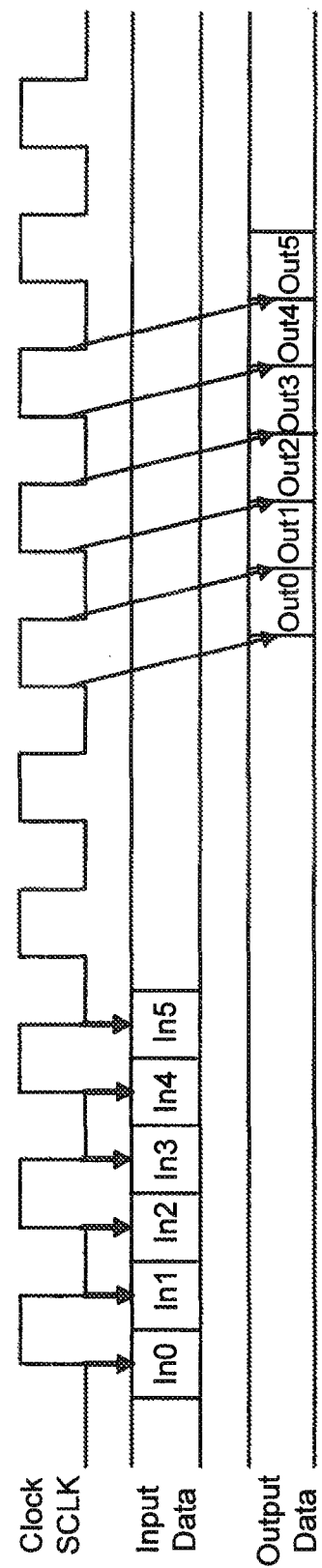
FIG. 2B illustrates a timing diagram of double data rate (DDR) operation of memory devices.

FIG. 2A depicts an example of a timing diagram of single data rate (SDR) operation of the memory devices of FIG. 1. FIG. 2B depicts an example of a timing diagram of double data rate (DDR) operation of the memory devices of FIG. 1. Each drawing shows operations in one port. In each of SDR and DDR operations, a common chip select signal (not shown) is commonly fed to enable all devices at the same time, so that input data of the first device is transferred to the last device through all device activation. The clock is used to latch input data streams at pre-defined registers in order to store bit information before the start of a memory core operation.

Referring to FIG. 2A, with SDR operation, during a first set of clock cycles data from the serial input is read into the device. In the example of FIG. 3A, this takes place over five clock cycles CL11, CL12, CL13, CL14, CL15 and input data In0, In1 In2, In3, and In4 is input to the device. During the next set of clock cycles, data is output by the device. In the illustrated example, there are five clock cycles CL21, CL22, CL23, CL24, CL25 that result in the output of output data Out0, Out1, Out2, Out3, Out4. In the illustrated example, it is the rising edge of the clock pulse that triggers the input or output of data, but other implementations are possible. Furthermore, while the timing diagram of FIG. 2A shows five bits being input and output, other implementations may use different numbers of bits. FIG. 2B is similar to FIG. 2A except that input and output data are latched on the rising and falling edges of the clock for DDR operation.

In a case where SDR is adopted as the interface type of the system, one edge, for example the rising edge of the clock, latches input data. In case of the DDR interface type, both edges of the clock latch input data to speed up the write and read operations. All data types (the device number, the command, the address, the input data) may be processed through the SDR or DDR operation. Both types of data rate interface (SDR or DDR) may be employed. In addition, other types of interfaces such as QDR (Quadruple Data Rate) and the like may be employed.

Figure 3:
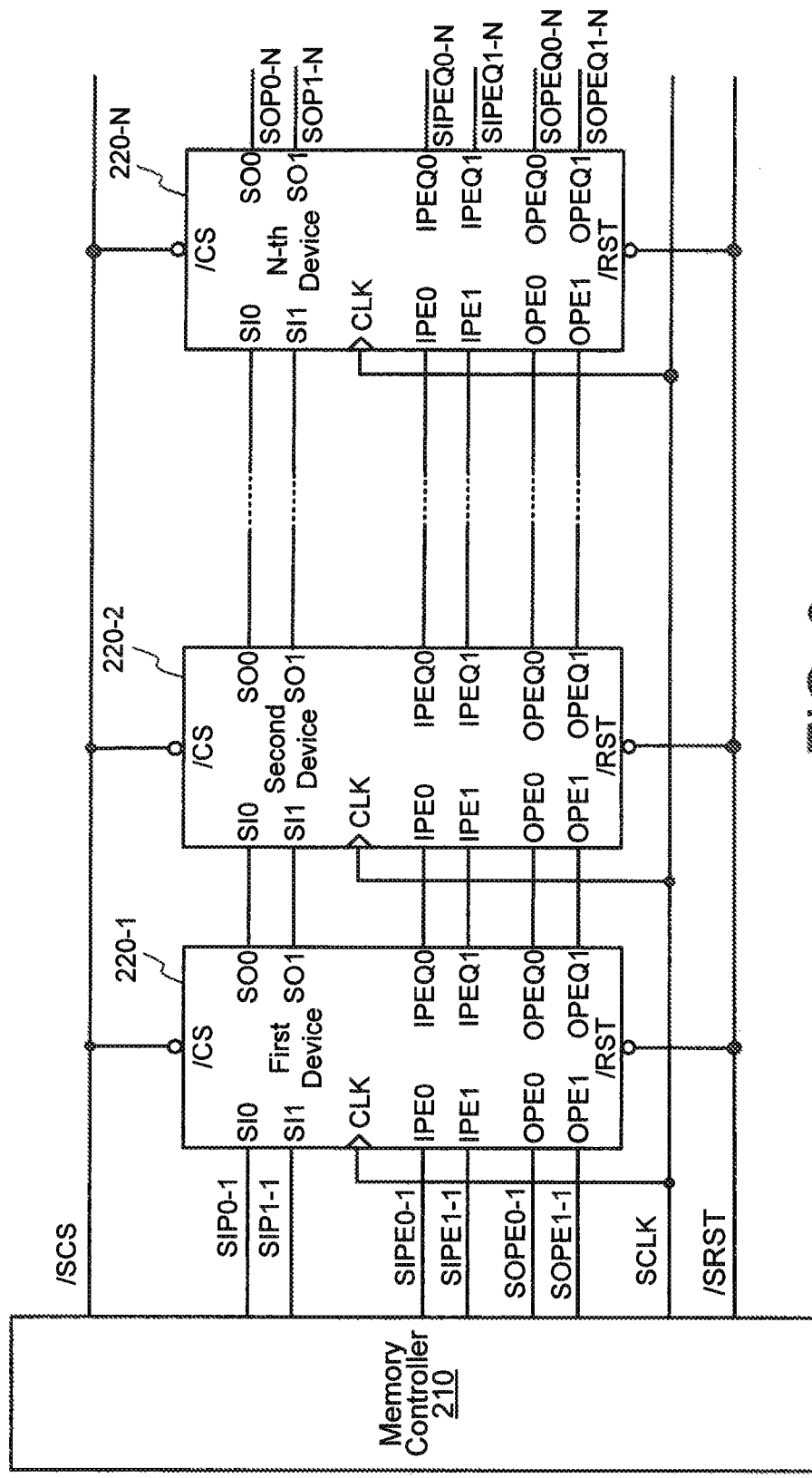
FIG. 3 shows a system including a memory controller and an interconnection configuration having a plurality of memory devices connected in-series to which embodiments of the present invention are applicable.

FIG. 3 shows a system including a controller and an interconnection configuration of series-connected devices to which embodiments of the present invention are applicable. Referring to FIG. 3, a system includes a memory controller 210 and a plurality of memory devices 220-1, 220-2, - - - , 220-N that are connected in-series, N being an integer greater than one.

At the devices, serial input and output ports are employed for the interconnected multiple memory devices. In the particular example illustrated in FIG. 3, each rectangular block represents a memory device. The core of each memory device (not shown) can be dynamic random access memory (DRAM) cells, static random access memory (SRAM) cells, flash memory cells, or the like. The devices are serially interconnected by multiple links.

Each of the devices has a plurality of input and output connections.

(i) serial input ports SI0, SI1 for receiving respective serial input signals SIP0, SIP1;
(ii) serial output ports SO0, SO1 for outputting respective serial output signals SOP0, SOP1;
(iii) input port enable inputs IPE0, IPE1 for receiving respective input port enable signals SIPE0, SIPE1;
(iv) output port enable inputs OPE0, OPE1 for receiving respective output port enable signals SOPE0, SOPE1;
(v) input port enable echo outputs IPEQ0, IPEQ1 for outputting respective input port enable echo signals SIPEQ0, SIPEQ1; and
(vi) output port enable echo outputs OPEQ0, OPEQ1 for outputting respective output port enable echo signals SOPEQ0, SOPEQ1.

The output ports of one device are interconnected to the input ports of a next device. A clock signal SCLK, a chip select signal /SCS and a reset signal /SRST are commonly fed to all devices. In this embodiment, the performance of the system can be determined, for example, by the loading of the clock.

Detailed circuits are provided to allow independent link and bank access. More generally, each device might be implemented with a single link, in which case the circuits providing independent link and bank access are not needed, or with more than two links. The remainder of this description assumes two links per device. Similarly, for the implementations detailed below, it is assumed that each device has two memory banks, and that each bank can be independently accessed from each link. More generally, each device has at least one memory bank, but may have two or more memory banks. Each device may have more than one input port and more than one output port.

The series-connected devices of FIG. 3 and the memory controller 210 are included the system which is similar to that of FIG. 1. The memory controller 210 sends serial input signals SIP0 and SIP1 and control signals. The control signals include input port enable signals SIPE0 and SIPE1 and output port enable signals SOPE0 and SOPE1. The memory controller 210 also provides a chip select signal /SCS, a clock signal SCLK and a reset signal /SRST. The serial input signals SIP0 and SIP1 are fed to the serial input ports SI0 and SI1 of the first device 220-1, respectively. The input port enable signal SIPE0 and SIPE1 are also fed to the input port enable inputs IPE0 and IPE1 of the first device 220-1, respectively. Furthermore, the output port enable signals SOPE0 and SOPE1 are fed to the output port enable inputs OPE0 and OPE1 of the first device 220-1, respectively.

Figure 4:
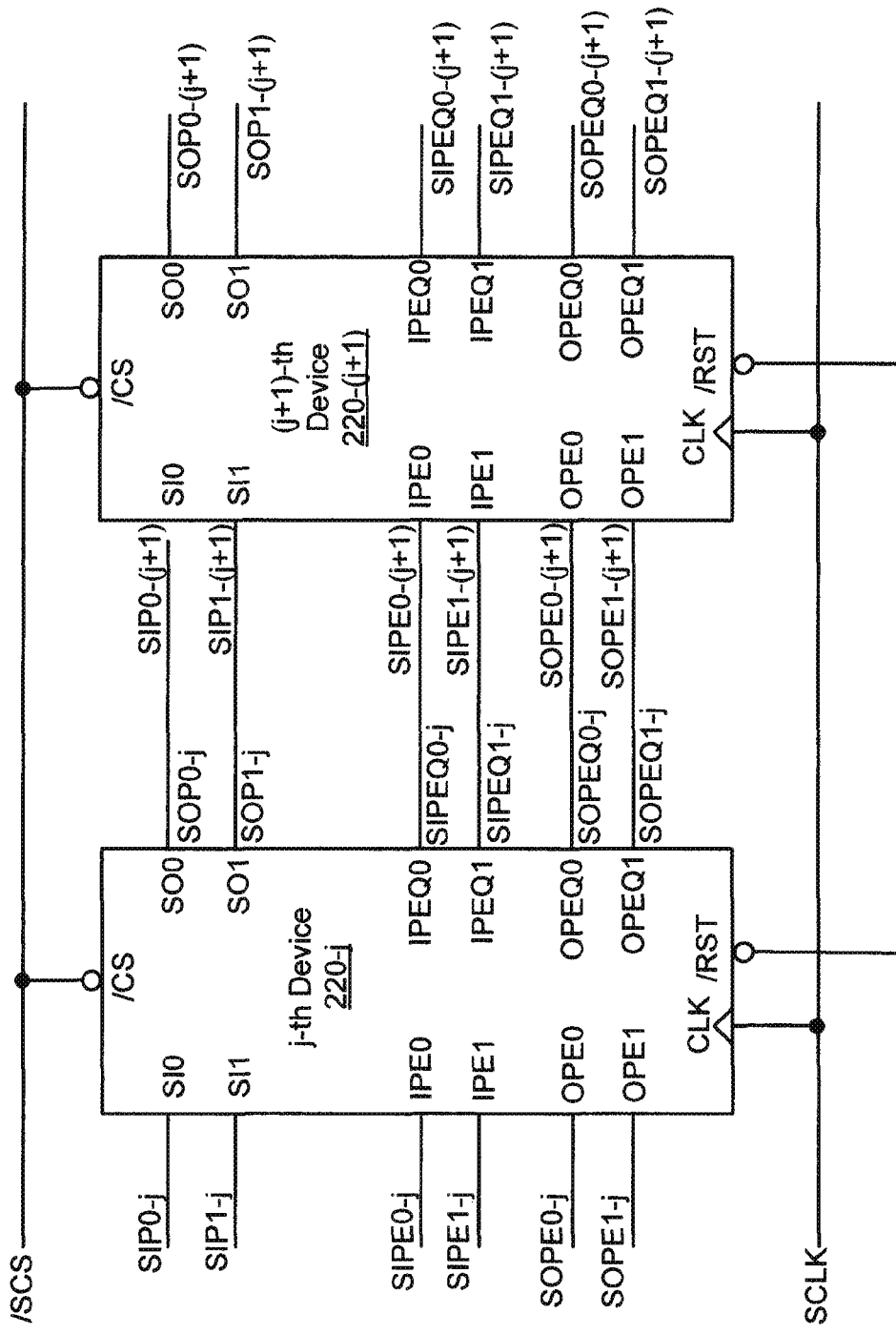
FIG. 4 illustrates two neighboring memory devices shown in FIG. 3.

FIG. 4 shows two memory devices shown in FIG. 3. Referring to FIGS. 3 and 4, two devices 220-$i$ and 220-($i$+1) represent two neighboring devices, where 1≦j<N. In a case of j=1, for example, the j-th device and (j+1)-th devices are the first and second devices 220-1 and 220-2, respectively.

Referring to FIGS. 3 and 4, in the first device 220-1, the serial input ports SI0, SI1; the input port enable inputs IPE0, IPE1; and the output port enable inputs OPE0, OPE1 are connected to the memory controller 210. The serial output ports SO0 and SO1 are connected to the serial input ports SI0 and SI1 of a next (the second) device 220-2, respectively. The input port enable echo outputs IPEQ0 and IPEQ1 are connected to the input port enable inputs IPE0 and IPE1 of the next device 220-2, respectively. The output port enable echo outputs OPEQ0 and OPEQ1 are connected to the output port enable inputs OPE0 and OPE1 of the next device 220-2, respectively.

Similarly, in the second device 220-2, the serial output ports SO0 and SO1 are connected to the serial input ports SI0 and SI1 of a next (the third) device, respectively. The input port enable echo outputs IPEQ0 and IPEQ1 are connected to the input port enable inputs IPE0 and IPE1 of the third device, respectively. The output port enable echo outputs OPEQ0 and OPEQ1 are connected to the output port enable inputs OPE0 and OPE1 of the third device, respectively.

Furthermore, each of the third device to the N-th device is connected in the similar manner. In the last (N-th) device 220-N, the serial output ports SO0, SO1; the input port enable echo outputs IPEQ0, IPEQ1; the output port enable echo outputs OPEQ0, OPEQ1 are connected to respective overall outputs (not shown). These overall outputs are connected back to the memory controller 210 to form a ring type connection. The overall outputs may be connected to another circuitry (not shown).

In the particular example shown in FIG. 3, the clock signal SCLK is commonly fed to the clock inputs CLK of the devices 220-1-220-N of the interconnection configuration. Also, the chip select signal /SCS is commonly fed to the chip select inputs /CS of all devices. When the chip select signal /SCS is logic "low" (more generally "enable"), the first to N-th devices 220-1-220-N are enabled at the same time, so that the input data contained in the serial input signal or is transferred from the first device 220-1 to the last device 220-N through all device activation. The first device 220-1 is enabled by either of input port enable signals fed to the input port enable inputs IPEO0, IPE1 thereof. Output operation of the device is enabled by either of output port enable signals fed to the output port enable inputs OPE0, OPE1 thereof. The first device 220-1 provides input port enable echo signals SIPE0, SIPEQ1 and output port enable echo signals SOPEQ0, SOPEQ1 from its input port enable echo outputs IPEQ0, IPEQ1 and output port enable outputs OPEQ0, OPEQ1 to the second device 220-2. Similarly, each of the other devices 220-2 to 220-N is enabled by its input and output enable signals fed to its input and output port enable inputs IPE and OPE. The input and output port enable echo signals are provided from its input and output port enable echo outputs IPEQ and OPEQ, respectively.

In order to perform serial input capture, all serial input streams should be sent to each assigned device in accordance with the bit location (e.g., command, address or data). Along with this operation, the serial input streams are sent to the next device, at which these serial bits are sent again to the next device and so on. In order to achieve sequentially clock-synchronized bit transferring, a systematic approach to timing determination is provided.

The memory controller 210 issues commands, each of which include a device identifier (ID) number, a command operation code (hereinafter OP code). Some commands may additionally include address information, and some commands may additionally include data. Each OP code is associated with a respective operation. Each command is also referred to herein as having a type that is associated with the OP code contained in the command. For example, a command containing a read OP code may be referred to as a "read command". For example, commands for use in the series-connected devices are flexible modular commands.

Figure 5:
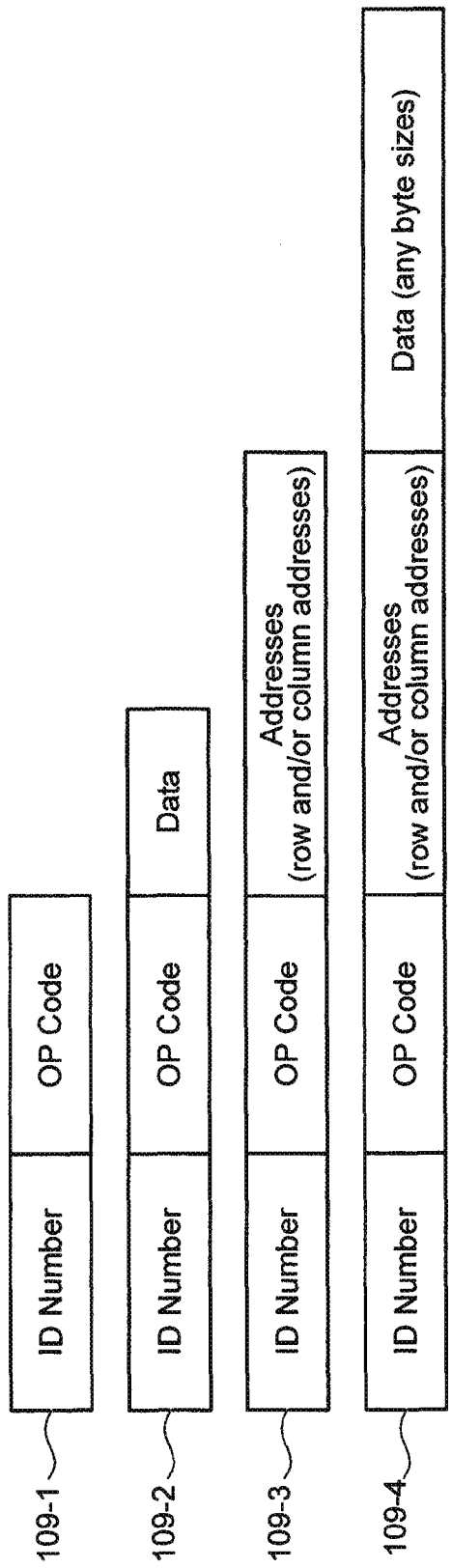
FIG. 5 illustrates example command formats for use in an interconnection configuration.

FIG. 5 is a schematic of example command formats for the memory devices interconnected in-series. Referring to FIG. 5, a first command format 109-1 includes an ID number (e.g., 1 byte) and an OP code (e.g., 1 byte). The ID number is used to uniquely identify a selected memory device (a device address (DA)), while the OP code field contains the OP code to be executed by the selected device. Commands with the first command format 109-1 may for example be used for commands containing OP codes for reading a register value. A second command format 109-2 includes an ID number, an OP code and data. Commands with the second command format 109-2 may for example be used for commands containing OP codes for writing data to a register. A third command format 109-3 includes an ID number, an OP code, and additional addresses. The additional addresses may for example include row address (e.g., 3 bytes) and/or column address (e.g., 2 bytes) for addressing a location in memory cells. Commands with the third command format 109-3 may for example be used for commands containing OP codes for reading data from memory cells of a selected memory device. A fourth command format 109-4 includes an ID number, an OP code, additional addresses, and data (e.g., 1-2112 bytes). Commands with the fourth command format 109-4 may for example be used for commands containing OP codes for writing data to the memory cells of a selected memory device. Note that all four example command formats 109-1, 109-2, 109-3, 109-4 start with an ID number for addressing purposes. It should be understood from the foregoing that the term "command" as used herein does not merely refer to a command OP code, as a command may include an ID number, an OP code, additional addresses, data, or any other information relating to the control of an arrangement of memory devices interconnected in-series.

A particular example of the above-referenced command structures is disclosed in commonly assigned and co-pending U.S. patent application Ser. No. 11/840,692 filed on Aug. 17, 2007 and U.S. Provisional Patent Application No. 60/892,705 filed on Mar. 2, 2007, the contents of which are hereby incorporated by reference in their entirety. The applications disclose different command structures to distinguish core access operations that involve relatively long processing times from page buffer access operations that involve relatively short access times. Further details of the modular command structure are provided later.

Figure 6:
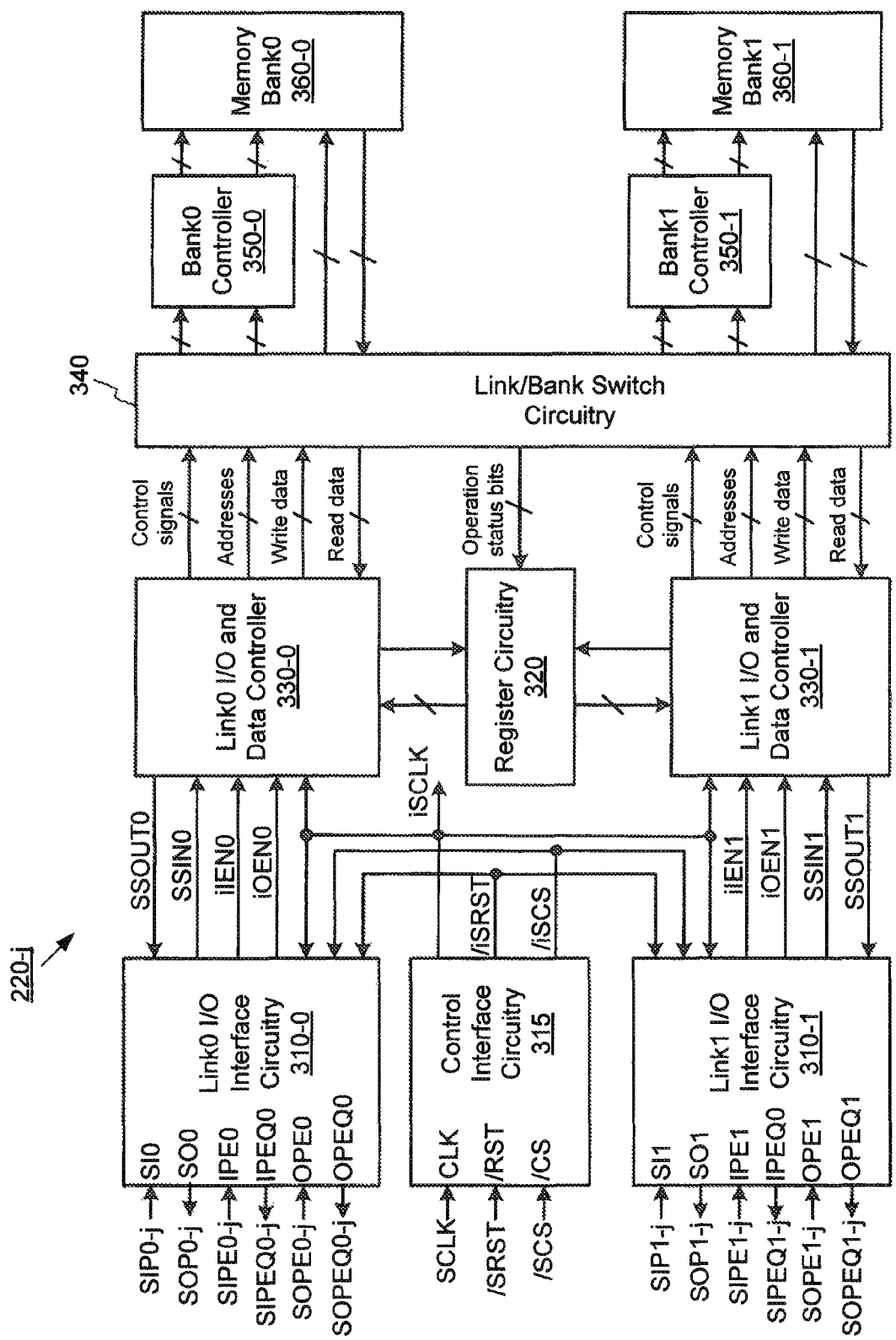
FIG. 6 is a detailed block diagram of one of the devices shown in FIG. 3.

FIG. 6 shows one of the series-connected memory devices shown in FIGS. 3 and 4. Referring to FIGS. 3-6, a representing memory device 220-*j* has two links, referred to hereinafter as link0 and link1. The present device 220-*j* includes two I/O interfaces, one for each of the two links, namely: link0 I/O interface circuitry 310-0 and link1 I/O interface circuitry 310-1. The link0 I/O interface circuitry 310-0 has inputs: SI0, IPE0, OPE0 and corresponding outputs SO0, IPEQ0, OPEQ0. The serial input port SI0 is for receiving a link0 serial input signal SIP0-*j*. The input port enable input IPE0 is for receiving a link0 input port enable signal SIPE0-*j*. The output port enable input OPE0 is for receiving a link0 output port enable signal SOPE0-*j*. The serial output port SO0 is for providing a link0 serial output signal SOP0-*j*. The input port enable echo output IPEQ0 is for providing a link0 input port enable echo signal SIPEQ0-*j*. The output port enable echo output OPEQ0 is for providing a link0 output port enable echo signal SIPEQ0-*j*. Similarly, the link1 I/O interface circuitry 310-1 has inputs: SI1, IPE1, OPE1 and corresponding outputs SO1, IPEQ1 and OPEQ1. The serial input port SI1 is for receiving a link1 serial input signal SIP1-*j*. The input port enable input IPE1 is for receiving a link1 input port enable signal SIPE1-*j*. The output port enable input OPE1 is for receiving a link1 output port enable signal SOPE1-*j*. The serial output port SO1 is for providing a link1 serial output signal SOP1-*j*. The input port enable echo output IPEQ1 is for providing a link1 input port enable echo signal SIPEQ1-*j*. The output port enable echo output OPEQ1 is for providing a link1 output port enable echo signal SIPEQ1-*j*.

The device 220-*j* also includes control interface circuitry 315. In the particular example illustrated in FIG. 6, the control interface circuitry 315 has: a clock input CLK for receiving the clock signal SCLK; a reset signal /RST for receiving the reset signal /SRST; and a chip select input /CS for receiving the chip select signal /SCS. In response to the clock signal SCLK, the reset signal /SRST and the chip select signal /SCS, the control interface circuitry 315 provides an internal clock signal iSCLK, an internal reset signal /iRST and an internal chip select signal /iSCS to the link0 I/O interface circuitry 310-0 and the link1 I/O interface circuitry 310-1. The control interface circuitry 315 may also receive a complementary clock input (not shown, referred to as /SCLK). Whether the complementary clock signal /SCLK is used or not is determined according to the data rate. Use of the complementary clock signal /SCLK will be described later with reference to FIGS. 22-24.

The device 220-*j* also includes a link0 I/O and data controller 330-0, a link1 I/O and data controller 330-1, register circuitry 320 and link/bank switch circuitry 340. The link0 I/O and data controller 330-0 is located between the link0 I/O interface circuitry 310-0 and the link/bank switch circuitry 340. The link1 I/O and data controller 330-1 is located between the link1 I/O interface circuitry 310-1 and the link/bank switch circuitry 340. The link0 and link1 I/O and data controllers 330-0, 330-1 receive the internal clock signal iSCLK. The internal clock signal iSCLK is provided to other circuitry of the device 220-*j* shown in FIG. 6, but the clock signal paths are not shown. The controllers, the circuitry, registers receive clock signals for their operation.

The link0 I/O interface circuitry 310-0 provides an internal serial input signal SSIN0, an internal input enable signal iIEN0, and an internal output enable signal iOEN0 to the link0 I/O and data controller 330-0. The link0 I/O and data controller 330-0 provides an internal serial output signal SSOUT0 to the link0 I/O interface circuitry 310-0. Similarly, the link1 I/O interface circuitry 310-1 provides an internal serial input signal SSIN1, an internal input enable signal iIEN1, and an internal output enable signal iOEN1 to the link1 I/O and data controller 330-1. The link1 I/O and data controller 330-1 provides an internal serial output signal SSOUT1 to the link1 I/O interface circuitry 310-1.

The internal serial input signals SSIN0, SSIN1; the internal input enable signals iIEN0, iIEN1 and the internal output enable signals iOEN0, iOEN1 output by the link0, link1 I/O interface circuitry 310-0, 310-1 in response to the serial input signals SIP0-*j*, SIP1-*j*; the input port enable signals SIPE0-*j*, SIPE1-*j*; and the output port enable signals SOPE0-*j*, SOPE1-*j* will be described later with reference to FIGS. 9-11.

The link0, link1 I/O and data controllers 330-0, 330-1 perform control functions for the link0, link1, respectively. The link0 I/O and data controller 330-0 outputs various signals and information that include control signals, addresses, and write data, all of which are provided to the link/bank switch circuitry 340. The link0 I/O and data controller 330-0 receives read data from the link/bank switch circuitry 340. The link0 I/O and data controller 330-0 communicates with the register circuitry 320 to output and receive status and device information signals. Similarly, the link1 I/O and data controller 330-1 also outputs various signals and information to and receives read data from the link/bank switch circuitry 340. The link1 I/O and data controller 330-1 also communicates with the register circuitry 320. The register circuitry 320 receives operation status bits from the link/bank switch circuitry 340. The outputs of the internal serial output signals SSOUT0, SSOUT1 from the link0, link1 I/O and data controllers 330-0, 330-1 to the link0, link1 I/O interface circuitry 310-0, 310-1, respectively, will be described later with reference to FIGS. 10 and 11.

The link/bank switch circuitry 340 has outputs connected to a bank0 controller 350-0 which has control signal outputs connected to a memory bank0 360-0. There are also read and write interconnections between the link/bank switch circuitry 340 and the memory bank0 360-0. Also, the link/bank switch circuitry 340 has control outputs connected to a bank1 controller 350-1 which controls a memory bank1 360-1. There are read and write interconnections between the link/bank switch circuitry 340 and the memory bank1 360-1. With the circuit shown, the input from one of the two link I/O interface circuitry 310-0 and 310-1 can be connected to one of the memory banks 360-0 and 360-1 independently.

The serial data flow from the link I/O interfaces to the memory banks is controlled. The bits of the serial input signal SIP contain no information on how many bits are included in each of the command, address, and data fields when input to a device. In order to determine when the valid serial data of the serial input signal SIPk is fed to the serial input port SIk (k=0 or 1), the input port enable signal SIPEk (k=0 or 1) is asserted. Here, if k=0, it will designate the link0 and k=1, it will designate the link1.

The rising edge of the input port enable signal SIPEk is the start point of data input on the serial input port SIk and the falling edge is the end point of the serial data. In some embodiments, both interconnection configuration and single device operations are implemented, and each device self-recognizes the configuration when operating. In order to recognize whether the interconnection configuration or single device, some embodiments use the approach taught in commonly assigned co-pending U.S. Provisional Patent Application No. 60/787,710.

Figure 7:
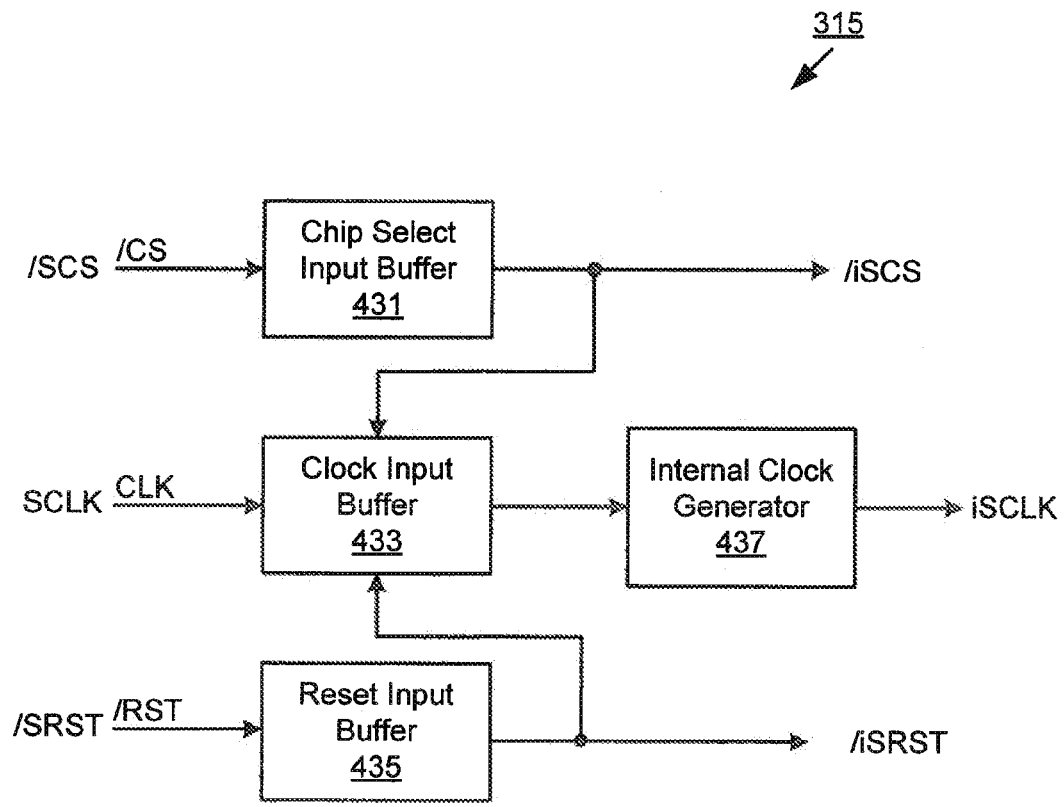
FIG. 7 is a block diagram of an example implementation of a control interface circuit shown in FIG. 6.
Figure 8:
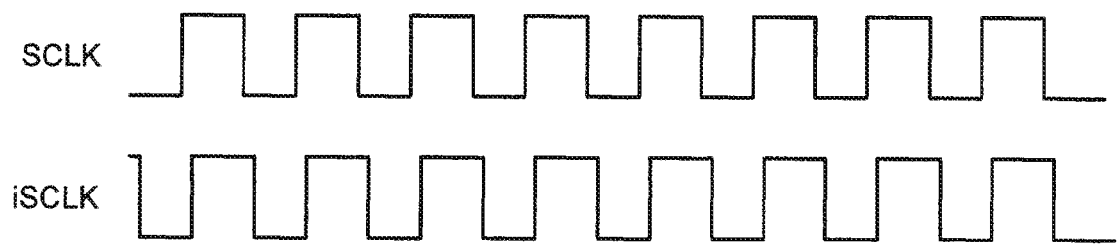
FIG. 8 illustrates a timing diagram of SDR operation with a clock signal.

FIG. 7 shows an example implementation of the control interface circuitry 315 shown of FIG. 6. Referring to FIG. 7, the control interface circuitry 315 includes three input buffers 431, 433 and 435 and an internal clock generator 437. The chip select signal /SCS, the clock signal SCLK and the reset signal /SRST are fed to the chip select input buffer 431, the clock input buffer 433 and the reset input buffer 435, respectively. The chip select input buffer 431 provides a buffered signal of the chip select signal /SCS as the internal chip select signal /iSCS. The clock input buffer 433 provides a buffered signal of the clock signal SCLK that is fed to internal clock generator 437 to produce the internal clock signal iSCLK. The reset input buffer 435 provides a buffered signal of the reset signal /SRST as the internal reset signal /iSRST. The internal clock generator 437 produces the internal clock signal iSCLK, in response to the rising edge of input clocks for the SDR mode operation. The internal clock generator 437 only generates clock transitions while the chip select signal /SCS is low. Otherwise, the internal clock signal iSCLK is low and the clock generation circuitry is in a standby mode. An example of an internal clock signal iSCLKs for the SDR operation produced form the clock signal SCLK is shown in FIG. 8.

Figure 9:
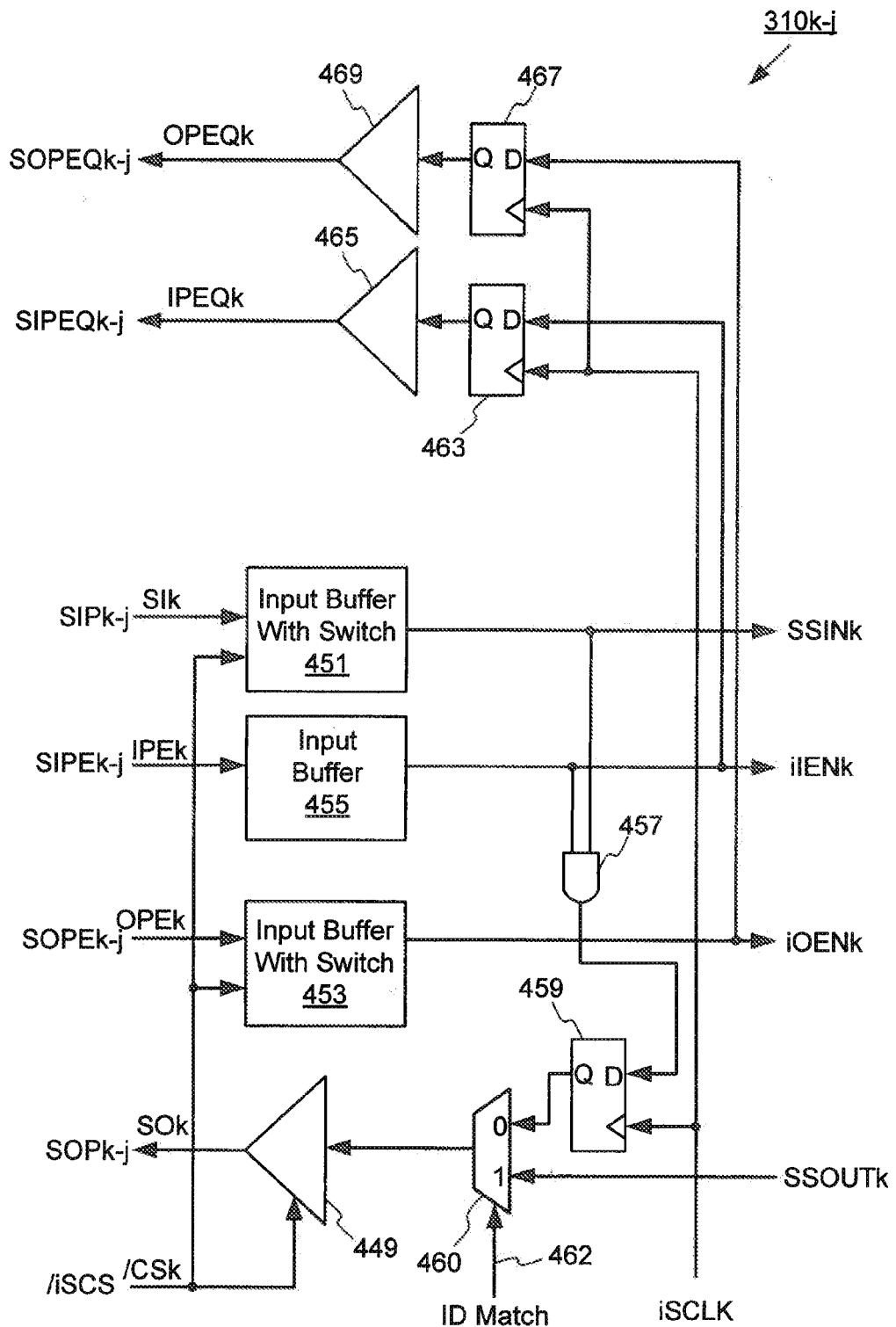
FIG. 9 is a block diagram of an example implementation of link0 or link1 interface circuits shown in FIG. 6.

FIG. 9 shows a detailed circuit of the link I/O interface circuitry that represents one of the link0 I/O interface circuitry 310-0 and the link1 I/O interface circuitry 310-1 shown in FIG. 6. Referring to FIG. 9, a link I/O interface circuitry 310-$k$ has four inputs (serial input port SIk, input port enable input IPEk, output port enable input OPEk, chip select input /CSk); one serial output port SOk; and two echo outputs (IPEQk, OPEQk). In the circuitry 310-0 (k=0), the serial input port SIk, the input port enable input IPEk, the output port enable input OPEk, the serial output port SOk, the input port enable echo output IPEQk, the output port enable echo output OPEQk correspond to the serial input port SI0, the input port enable input IPE0, the output port enable input OPE0, the serial output port SO0, the input port enable echo output IPEQ0, the output port enable echo output OPEQ0 for link0 I/O interface circuitry 310-0 shown in FIG. 6, respectively. Similarly, in the circuitry 310-1 (k=1), the serial input port SIk, the input port enable input IPEk, the output port enable input OPEk, the serial output port SOk, the input port enable echo output IPEQk, the output port enable echo output OPEQk correspond to the serial input port SI1, the input port enable input IPE1, the output port enable input OPE1, the serial output port SO1, the input port enable echo output IPEQ1, the output port enable echo output OPEQ1 for link1 I/O interface circuitry 310-1, respectively.

The internal chip select signal /iSCS is provided to two input buffers with switch 451 and 453 and an output buffer 449 to enable them. The input buffers with switch 451 and 453 receive and buffer the serial input signal SIPk-j and the output port enable input signal SOPEk-j, respectively. They are both controlled by the internal chip select signal /iSCS, so that buffered versions of the serial input signal SIPk-j and the output port enable signal SOPEk-j are output as an internal serial input signal SSINk and an internal output enable signal iOENk, respectively. When the chip select signal /SCS is high (no selection state), the internal serial input signal SSINk and the internal output enable signal iOENk are low. The link I/O interface circuitry 310-$k$ includes an input buffer 455 to receive the input port enable signal SIPEk-j and provides an internal input enable signal iIENk.

The output signal SSINk of the buffer with switch 451 and the output signal iIENk of the buffer 455 are fed to respective inputs of an AND gate 457, the AND logic output signal of which is fed to the D input of a D flip-flop (D-FF) 459. The Q output signal of the D-FF 459 is fed to a "0" input of a selector 460. A "1" input of the selector 460 is connected to receive an internal serial output signal SSOUTk containing data output from the particular device, for example, as a result of a read operation. The output signal of the selector 460 is selected to be either the output signal of the D-FF 459 (a delayed version of the serial input signal) or the internal serial output signal SSOUTk (the locally generated serial output signal) in response to the output signal of a comparator included in the link I/O and data controller 330-$k$. The comparator's output signal is an ID match signal 462 provided by the link I/O and data controller 330-$k$ that will be described later with reference to FIG. 10.

In addition, the output signal iIENk of the input buffer 455 is fed to a D-FF 463 and the output signal iOENk of the input buffer with switch 453 is fed to another D-FF 467. The D-FFs 463 and 467 are clocked by the internal clock signal iSCLK. The output signals of the D-FFs 463 and 467 are passed through output buffers 465 and 469, respectively, and the input port enable echo signal SIPEQk-j and the output port enable echo signal SOPEQk-j are output.

In operation, the serial output port SOk provides either an echo of the serial input signal SIPk or an output result of the memory device itself. During the input data capture, the input port enable signal SIPEk-j is high and thus, the internal input enable signal iIENk is also high. In response to the "high" internal input enable signal iIENk, the internal serial input signal SSINk is provided to the D-FF 459. The D-FF 459 provides the delayed version of the serial input signal SIPk-j to the selector 460. When the ID match signal 462 is low (i.e., the j-th device 220-$j$ is not designated), the selector 460 outputs the output signal of the D-FF 459, that is the delayed version of the serial input signal SIPk-j logically combined with the input port enable signal SIPEk-j with one cycle latency. It could be one cycle or half-cycle in accordance with the interface style, SDR, or DDR. The D-FF 463 delays the input port enable signal SIPEk-j as much as one cycle (or half-cycle) and then it outputs a result. Therefore, the input port enable echo signal SIPEQk-j is forwarded to the next device 220-($j$+1) through the output buffer 465.

During the read operation, the output port enable signal SOPEk-j is high and thus, the "high" internal output enable signal iOENk is provided. If the ID match signal 462 is "high" (i.e., the ID number contained in the command matches the device ID (i.e., the device address) of the present device (220-$j$)), the selector 460 will select the internal serial output signal SSOUTk, the local data output. In addition, the D-FF 467 delays the output port enable signal SOPEk-j as much as one cycle (or half-cycle) and then it outputs a result. Thus, the output port enable echo output SOPEQk-j is forwarded to the next device 220-($j$+1) through the output buffer 469.

Because of the clock delay, each device in the interconnection configuration introduces a one cycle latency (or half cycle latency). The selector 460 is used to send to the serial output port SO either the echo signal of the serial input signal SIP or the result from the assigned operation (e.g., a data read). Therefore, the input port enable signal SIPE and the output port enable signal SOPE should not overlap with each other.

Figure 10:
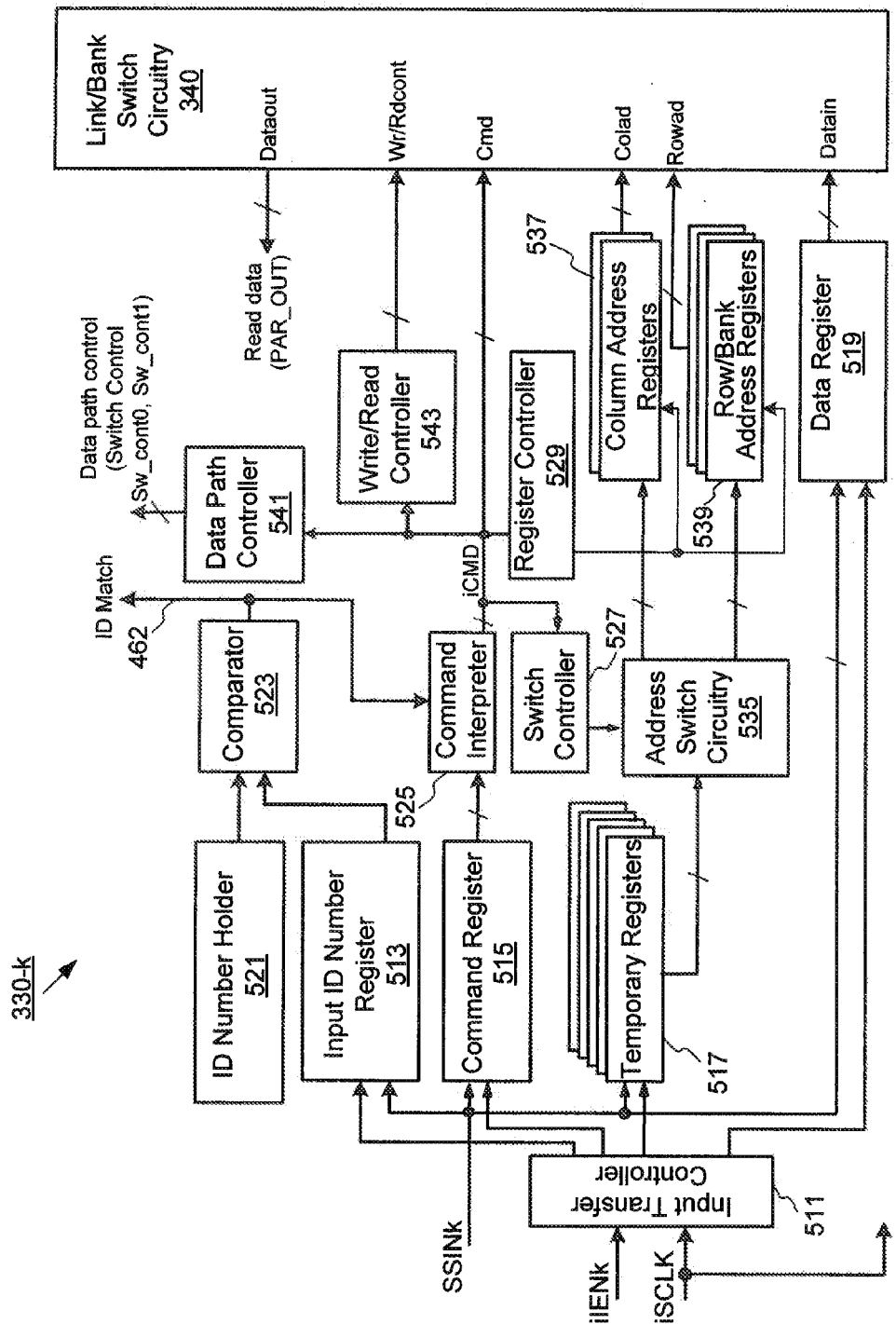
FIG. 10 is a block diagram of an example implementation of link0 or link1 I/O and data controller shown in FIG. 6.

FIG. 10 shows an example of the circuit for implementing the link I/O and data controller. A circuit 330-$k$ illustrated in FIG. 10 represents the link0 I/O and data controller 330-0 (k=0) and the link1 I/O and data controller 330-1 (k=1) shown in FIG. 6. The serial input streams are sorted and latched in specified registers to interpret each byte value when the serial input signal SIP continuously takes input data without any gap after the raising of the input port enable signal SIPE. To catch every bit without loosing a single bit, temporary registers are used. Further details of an example implementation of this can be found in commonly assigned U.S. patent application Ser. No. 11/567,551 entitled "Apparatus and Method for Capturing Serial Input Data" filed Dec. 6, 2006, the content of all of which is entirely incorporated herein by reference.

Figure 11:
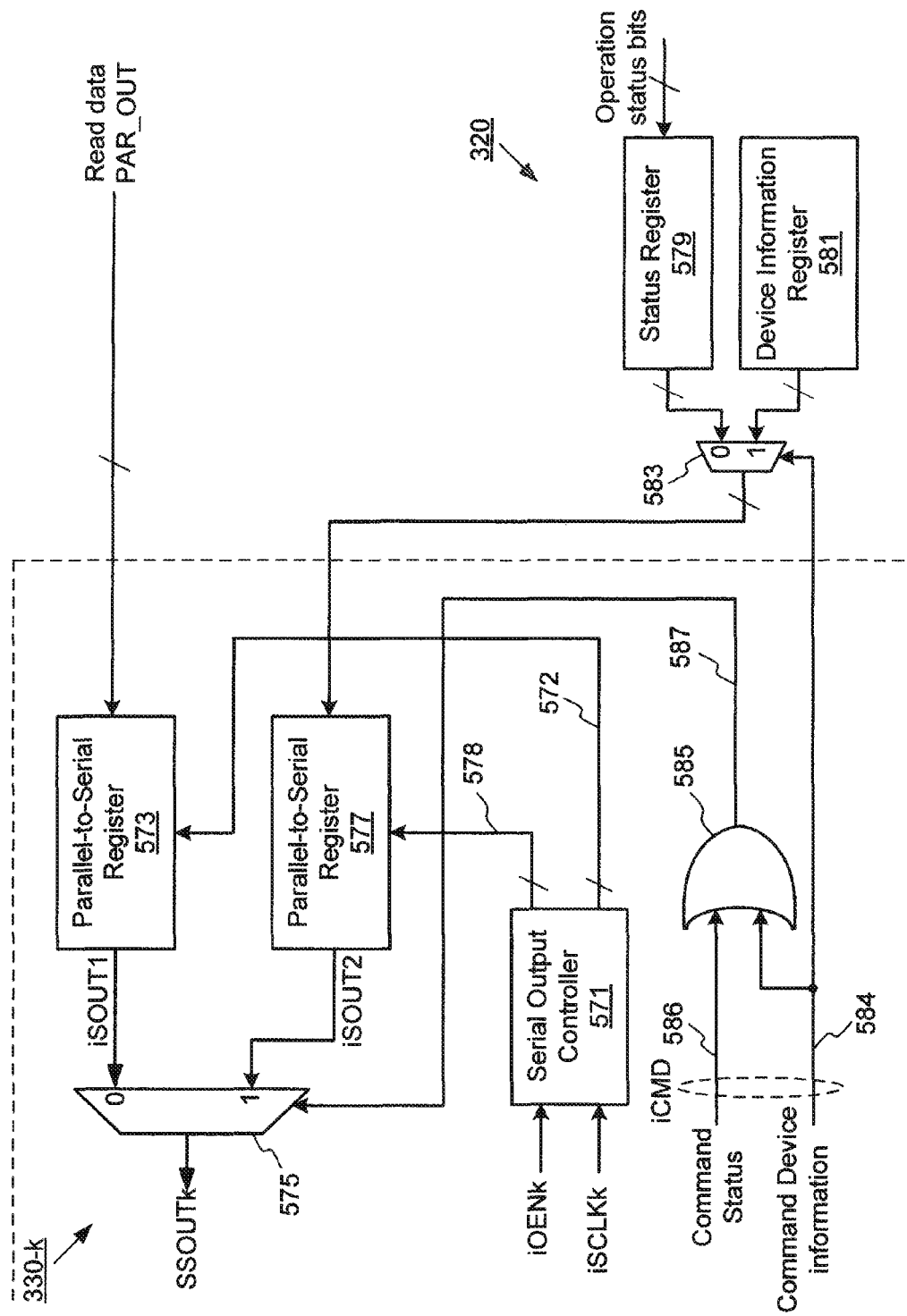
FIG. 11 is a block diagram of an example implementation of a register circuit and part of the link0 or link1 I/O and data controller shown in FIG. 6.

FIG. 11 shows part of the link I/O and data controller 330-*k* and an example of the register circuit 320 shown in FIG. 6. Referring to FIGS. 10 and 11, an input transfer controller 511 includes the logic of switching the location of serial input data based on a pre-defined sequence associated with a decoded command type. Detailed operation is described in U.S. patent application Ser. No. 11/567,551 entitled "Apparatus and Method for Capturing Serial Input Data" filed Dec. 6, 2006. From the input transfer controller 511, the clocks are provided and each register takes serial data with these separated unique clocks. The ID number holder 521 stores the device own ID number. This might for example have been generated during ID number generation mode described in commonly assigned co-pending application Ser. No. 11/529,293 filed Sep. 29, 2006, the content of which is incorporated by reference in its entirety.

The input transfer controller 511 receives the internal input enable signal iIENk and the internal clock signal iSCLK and provides clocks for clocking in the appropriate portion of the internal serial input signal SSINk. Although the selected controllers and circuitry shown in FIG. 10 receive the internal clock signal iSCLK, the clock paths are not shown. By the input transfer controller 511, device ID clock, command clock, temporary registration clock and data clock are provided to an input ID number register 513, a command register 515, temporary registers 517 and a data register 519, respectively. The internal serial input signal SSINk is fed to the inputs of the device ID register 513, the command register 515, the temporary registers 517 and the data register 519. An ID number holder (a register) stores the ID number of the ID (the device address (DA)) of the device 220-*j*. The output signal representing the ID number contained in the input ID register 513 and the ID number stored in the ID number holder 521 are fed to a comparator 523 which in turn outputs a comparison result signal as the ID match signal 462. The ID match signal 462 is fed to a command interpreter 525 and the selector 460 shown in FIG. 9. The command interpreter 525 also receives the output signal of the command register 515. The output signal (interpreted command iCMD) of the command interpreter 525 is fed to a switch controller 527, a register controller 529 and a command input Cmd of the link/bank switch circuitry 340. The link/bank switch circuitry 340 has the inputs and outputs corresponding to the plurality of links and banks.

The output signal of the temporary registers 517 is fed to address switch circuitry 535 that is controlled by an output signal of the switch controller 527. The address switch circuitry 535 has outputs coupled to column address registers 537 and row/bank address registers 539. The column address registers 537 have outputs coupled to a column address input Colad of the link/bank switch circuitry 340. The row/bank address registers 539 have outputs coupled to a row address input Rowad of the link/bank switch circuitry 340. The output signal iCMD from the command interpreter 525 is also fed to a data path controller 541 and a write/read controller 543. The data path controller 541 outputs data path control signals. The write/read controller 543 has an output coupled to a write/read control input Wr/Rdcont of the link/bank switch circuitry 340.

The data path control signals from the data path controller 541 of the link0 I/O and data controller 330-0 include a switch control signal "sw_cont0" and the data path control signals from the data path controller 541 of the link1 I/O and data controller 330-1 include a switch control signal "sw_cont1". The switch control signals "sw_cont0" and "sw_cont1" are used for switching the flows of various signals and data by the link/bank switch circuitry 340. The switching functions of the link/bank switch circuitry 340 will be described later with reference to FIG. 18.

The link I/O and data controller 330-*k* processes data in accordance with the status of the interconnection configuration and the device ID number, such as number of banks, cell type, number of links, and page size, etc. As shown in FIG. 11, the link I/O and data controller 330-*k* further includes a serial output controller 571, first and second parallel-to-serial registers 573, 577, an output selector 575, and an OR gate 585.

Referring to FIGS. 10 and 11, in response to the internal output enable signal iOENk and the internal clock signal iSCLK, the serial output controller 571 outputs shift clock and latch signals 572, 578 to the first and second parallel-to-serial registers 573, 577, respectively. The first parallel-to-serial register 573 also receives the read data "PAR_OUT" from the data output Dataout of the link/bank switch circuitry 340. The OR gate 585 receives a command device information signal 584 and a command status signal 586 contained in the interpreted command signal iCMD provided by the command interpreter 525. An OR logic output signal 587 of the OR gate 585 is provided to a selection control input of the selector 575.

The command device information signal 584 is provided to a selection control input of a selector 583 which has "0" and "1" inputs for receiving the output signals from a status register 579 and a device information register 581, respectively. The selected output signal of the selector 583 is provided to the second parallel-to-serial register 577. The status register 579 receives and holds the operation status bits provided by the link/bank switch circuitry 340.

In response to the shift clock and latch signals 572 and 578, respectively, the first parallel-to-serial register 573 converts the read data (the parallel output data) to serial data to output a first serial data output signal iSOUT1 to the "0" input of the selector 575. Similarly, in response to the shift clock and latch signals 578, the second parallel-to-serial register 577 converts the output data from the selector 583 to serial data. A second serial data output signal iSOUT2 is provided to the "1" input of the selector 575 from the second parallel-to-serial register 577.

In operation, the serial output controller 571 produces the signals so that the parallel-serial registers 573 and 577 to operate. The register 573 needs the shift clock and latch signal 572 for shifting and latching data to decide the latch point of the parallel inputs (PAR_OUT). In the device information read operation, the command device information signal 584 selects the output from the device information register 581. The command status signal 586 in combination with the command device information signal 584 produces the output signal 587 of the OR gate 585, so that the selector 575 selects the second serial data output signal iSOUT2 of the second parallel-to-serial register 577. Therefore, the device information stored in the device information register 581 is provided as the internal serial output signal SSOUTk.

In the status read operation, in response to the command status signal 586, the selector 583 selects the output from the status register 579. The command status signal 586 in combination with the command device information signal 584 produces the output signal 587 of the OR gate 585, so that the selector 587 selects the second serial data output signal iSOUT2 of the second parallel-to-serial register 577. Therefore, the status stored in the status register 579 is provided as the internal serial output signal SSOUTk.

Other than two operations of the device information and status read, the output signal 587 of the OR gate 585 will result in the selection of the iSOUT1 of the first parallel-to-serial register 573, namely the read data, PAR_OUT, that comes from the core memory block (i.e., the memory bank) in the core memory data read operation.

Each of the selectors 575 and 583 selects one of two inputs with the respective selection control input signal. The top one ("0") of the inputs to each selector is chosen when the respective selection control input signal is low. Otherwise (that is, if the selection control input signal is high), the bottom one ("1") of the inputs is chosen. Each of the parallel-to-serial registers 577 and 573 has parallel inputs (multiple bit inputs) and a single output. The latch point of the parallel inputs is counted up by the overlapped time between the internal output enable signal iOENk and the internal clock signal iSCLK. When a defined number of cycles are input by the two input combination (the internal output enable signal iOENk and the internal clock signal iSCLK), the least bit clock that is defined by the number of bits of the parallel to serial register is considered as a reference time to make latch signal for the next parallel inputs.

Figure 12:
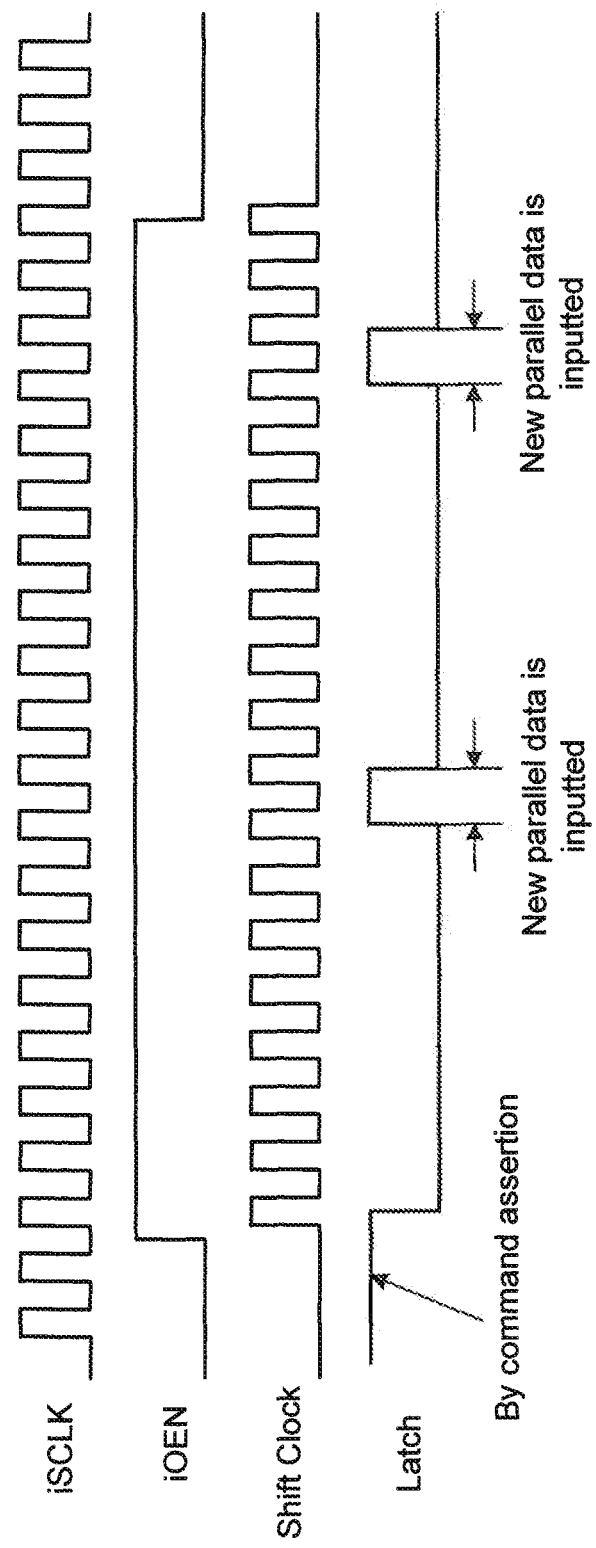
FIG. 12 illustrates a timing diagram of the data latching in parallel-to-serial registers shown in FIG. 11.

An example is shown in FIG. 12 where after eight bits on the internal output enable signal iOENk and the internal cock signal iSCLK, a pulse appears in the latch signal to latch the next parallel inputs. If the last byte is output, the first byte (8 bits) is reloaded with the time relationship shown in FIG. 12. Thus, the data is wrap-around.

The status register 579 and the device information register 581 store the device information in terms of operations and device itself, for example, device structure and supported features. Using two commands ("Read_Device_information" for reading device information and "Read_status" reading the status), device operation related results can be obtained through the serial output port SO.

In operation, in accordance with the procedures shown in FIGS. 20 and 21 detailed below, the input data from the serial input signal SIP is processed as follows. The data (or command) format for this example is the device ID (ID number of 1 byte), the command (OP code of 1 byte), optionally row address and/or column address, and optionally data (see FIG. 5). In response to the unique clocks provided by the input transfer controller 511, each of the input ID number register 513, the command register 515, the temporary registers 517 and the data register 519 takes the serial data and hold them therein until the next operation begins. More specifically, the device ID number contained in the command is stored in the device ID number register 513; the command (represented by the OP code) is stored in the command register 515; the column and/or row address are stored in the temporary registers 517; and the data is stored in the data register 519. Each address field has a pre-defined size such as, for example, 3-byte row address, two-byte column address. Using an internal counter (not shown), the input bits are counted and following bits are recognized with the decoded command bits. In order to take proper operation from the serial bit inputs, for example, two bytes are inserted between the command (i.e., the OP code) and the data address. Thus, the boundary between the address and the data can be recognized. The end of data input is controlled by the end of input port enable signal SIPE.

The ID number holder 521 stores the device own ID number (i.e., the device address DA). The comparator 523 compares the device ID number contained in the input command with the ID number stored in the ID number holder 521. If the command is directed to a particular device, command interpretation will be enabled. In the event that the command is directed to a particular device, for example, the j-the device, the comparator 523 included in the j-th device outputs the "high" ID match signal 462. In response to the high ID match signal 462, the command interpreter 525 decodes the contents stored in the command register 515 to output interpreted commands iCMD. The interpreted command iCMD includes a command type that is sent to the switch controller 527. The switch controller 527 generates switch control signals that are provided to the address switch circuitry 535. The interpreted command iCMD also includes a command device information or command status signal that is sent to the register controller 529 if the command is the device information read command or the status read command.

In accordance with the command type defined in an operating specification, the locations of the data in the temporary registers 517 can be changed. For example, if the command is a burst data read, such a command is followed by column addresses so that the contents of the temporary registers 517 are directed to the column address registers 537. If the command is a block erase, such a command is followed by row addresses so that the contents of the temporary registers 517 are directed to the row/bank address registers 539. The feedback of command decoding is used for the start point of next internal operations. The column address registers 537 and the row/bank address registers 539 receive the latch control signals from the register controller 529 to accept the parallel inputs from the temporary registers 517.

After the parallel output signals of the temporary registers 517 are fed to the parallel inputs of the assigned address registers 537 or 539, the appropriate latch signals are generated. In accordance with the command types and the addresses, generated latch signals or no latch signal generation are as follows:
  (i) Command+row and column address:
    row and column address latch signals are issued;
  (ii) Command+row address:
    only row address latch signal is issued;
  (iii) Command+column address:
    only column address latch signal is issued;
  (iv) Command+data:
    no latch signal is issued;
  (v) Command:
    no latch signal is issued.

The write/read controller 543 generates the relevant signals to accept the input data from the data register 519 or to send output data to the serial output port SO through an output buffer. The data path controller 541 includes the logic that determines which data is selected and sent to the output and which path should be enabled when operation is valid. The write/read controller 543 and the data path controller 541 make most of the control related signals in the link0 and link1 I/O and data controllers 330-0 and 330-1 shown in FIG. 6. The link/bank switch circuitry 340 receives the output of the write/read controller 543, the output of the command interpreter 525, the outputs of the column address registers 537, the row/bank address registers 539, and the outputs of the data register 519.

FIG. 13 is a table of an example command set for flash memory with modular command in byte mode. The table includes 13 operations: Page Read, Page Read for Copy, Burst Data Read, Burst Data Load Start, Burst Data Load, Page Program, Block Erase Address Input, Page-pair Erase Address Input, Erase, Operation Abort, Read Device Status, Read Device Information Register, and Write Link Configuration Register (device specific), and Write Link Configuration (broadcast). Each operation has a command including a Device Address (DA) (1 Byte) and an Operation (OP) Code (1 Byte). Some commands include a Row Address (3 Bytes), a Column Address (2 Bytes), and some commands include Input Data (1 to 2112 Bytes). 'X' is '0h' for "Bank 0". 'X' is '1h' for "Bank 1" where it is assumed for this specific example that each device has two memory banks. More generally each device has at least one memory bank. For the last command in the table, namely the write link configuration (broadcast), the device addess is set to "FFh" to indicate a "broadcasting" command.

Figure 14:
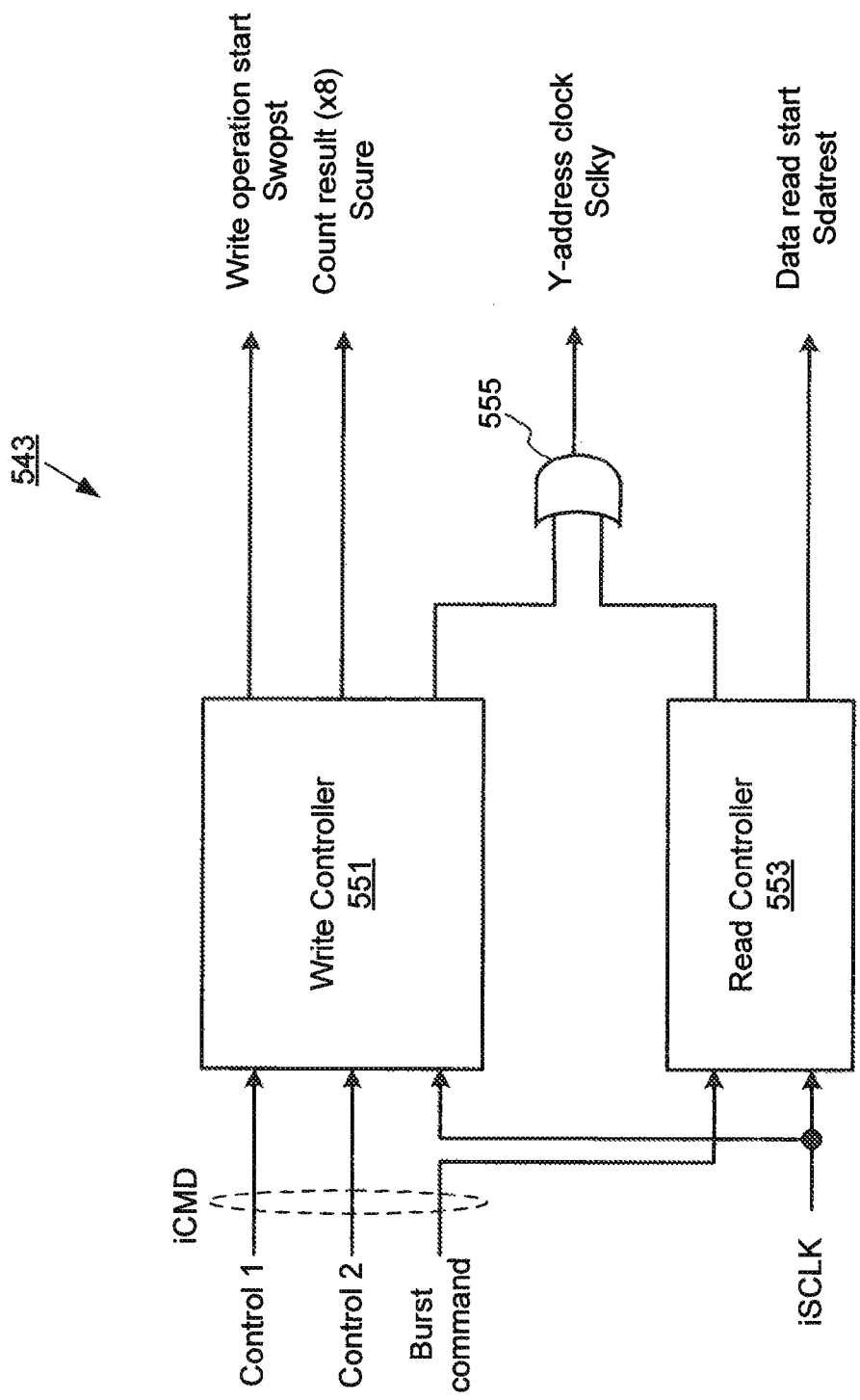
FIG. 14 is a block diagram of an example implementation of the write/read controller shown in FIG. 10.

FIG. 14 shows an example of the write/read controller 543 shown in FIG. 10. Referring to FIG. 14, the write/read controller 543 includes a write controller 551, a read controller 553 and an OR gate 555. The output (the interpreted command iCMD) of the command interpreter 525 of FIG. 10 is fed to the write controller 551 and the read controller 553. In the particular example illustrated in FIG. 14, "control 1" and "control 2" contained in the interpreted command iCMD are fed to the write controller 551. The "Burst" command contained in the interpreted command iCMD is fed to the read controller 553. The write controller 551 and the read controller 553 receive the internal clock signal iSCLK. The write controller 551 outputs a write operation start signal Swopst and a count result signal Scure. The read controller 553 outputs a data read start signal Sdatrest. The OR gate 555 outputs a y-address clock signal Sclky, in response to count outputs provided by the write controller 551 and the read controller 553.

Figure 15:
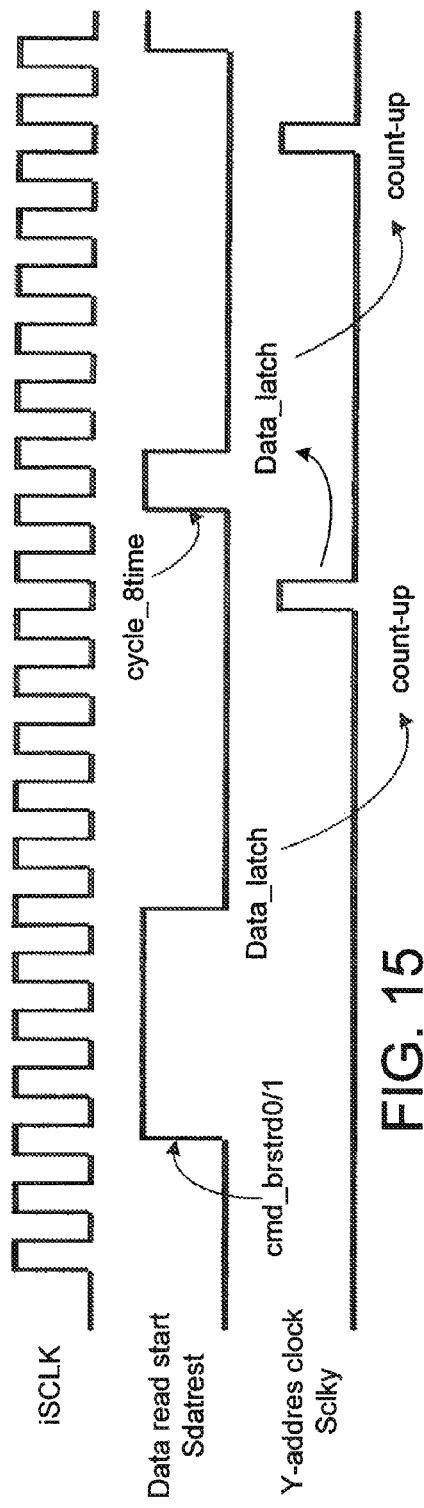
FIG. 15 is a timing diagram of the write control performed operation by the write/read controller shown in FIG. 14.
Figure 16:
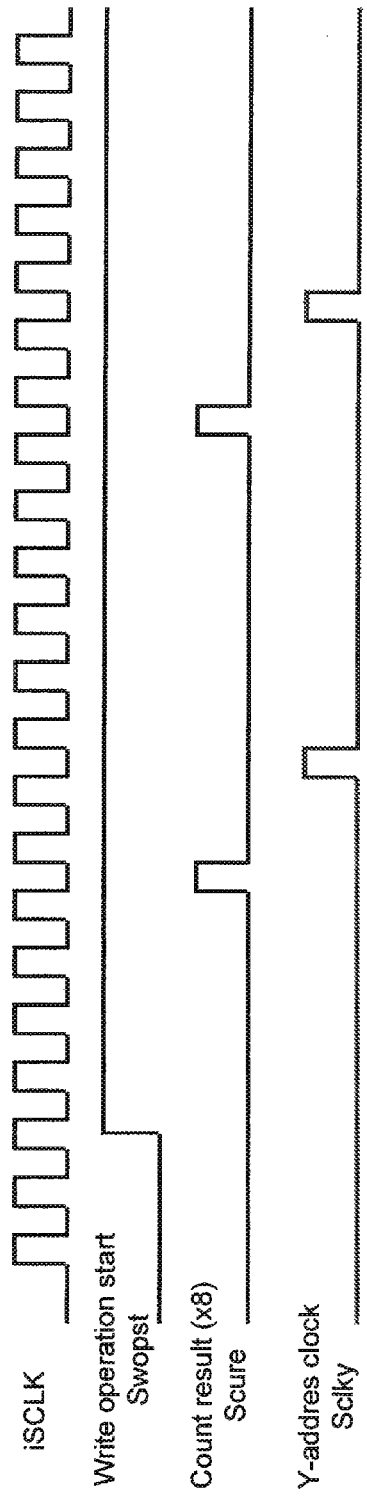
FIG. 16 is a timing diagram of the read control operation performed by the write/read controller shown in FIG. 14.

FIGS. 15 and 16 depict the write and read operations performed by the write controller 551 and the read controller 553 shown in FIG. 14, respectively.

The read operation of the interconnection configuration can be implemented using sequential y-address increment and, for example, 1-byte (8 bits) data latch per every eight cycles when data is read from page buffer which stores the sensed read result for read command. To catch the data from the page buffer and make the control signal of the y-address increment, there are clock intervals between them.

An example of the burst command, "Burst Data Read (2Xh)" ash shown in FIG. 13, initiates the signal generation of read control to count up the y-address and data latch operations for the page buffer (which is placed between the core cells and peripheral blocks). The data read start signal Sdatrest rises in response to the command burst assertion (cmd-bustrd0/1), which is the decoded internal signals for "Burst Data Read (2Xh)". The data read start signal Sdatrest falls in response to the data read shift clock that shifts the read data of PISO (Parallel Input Serial Output).

The data read shift clock results from the AND operation of the internal input enable signal iIEN (which is the buffered signal of input port enable input signal SIPE) and the internal clock signal iSCLK. The position of the y-address increment should be placed properly in the clock time internal to set new data on the read bus (x8) from the page buffer. The address pointer of the page buffer is up with the y-address clock. As such, it has to be done prior to the data write signal with enough timing margin. Parallel data is loaded during the high state of the parallel data write signal in the PISO which latches new data at the next rising transition point of the internal clock signal iSCLK after the parallel data write signal transits high. The data read start signal Sdatrest is a source signal of the enable signal that is used in the y-decoder to avoid any glitches as the command decode enabling does in the command decoder.

Except for the parallel to serial conversion operation of the read control, the write control has the same functional signals as output like "read control". The y-address clock signal Sclky of the write control is combined with the one of the read control. The count result (x8) is for the write control of the page buffer. In response to the count result signal Scure, data on a global data bus (write data bus) can be written into the page buffer. After that, the y-address counter is up in response to the y-address clock signal Sclky. The global data bus (not shown) is located between the link/bank switch circuitry 340 and the page buffer.

Figure 17:
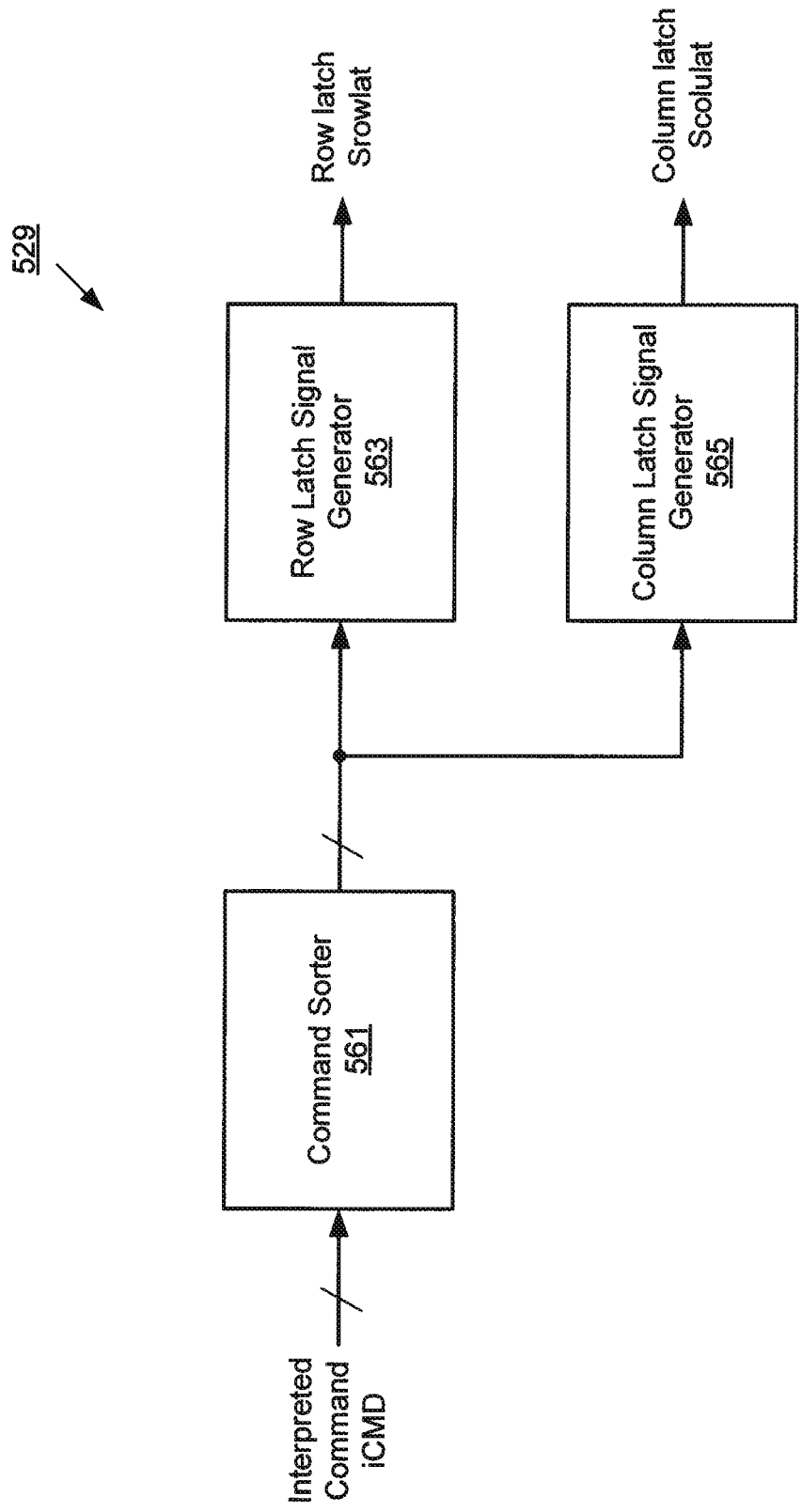
FIG. 17 is a block diagram of an example implementation of the register controller shown in FIG. 10.

FIG. 17 shows an example implementation of the register controller 529 shown in FIG. 10. Referring to FIGS. 10 and 17, the register controller 529 includes a command sorter 561, a row latch signal generator 563 and a column latch signal generator 565. The interpreted command iCMD from the command interpreter 525 is fed to the command sorter 561 that categorizes the input commands to identify the inputs followed by the command byte. The categorized inputs are fed to the row latch signal generator 563 and the column latch signal generator 565, so that a row latch signal Srowlat and a column latch signal Scolulat, respectively, are produced. The produced row and column latch signals Srowlat and Scolulat are fed to the row/bank address register 539 and the column address register 537, respectively.

Figure 18:
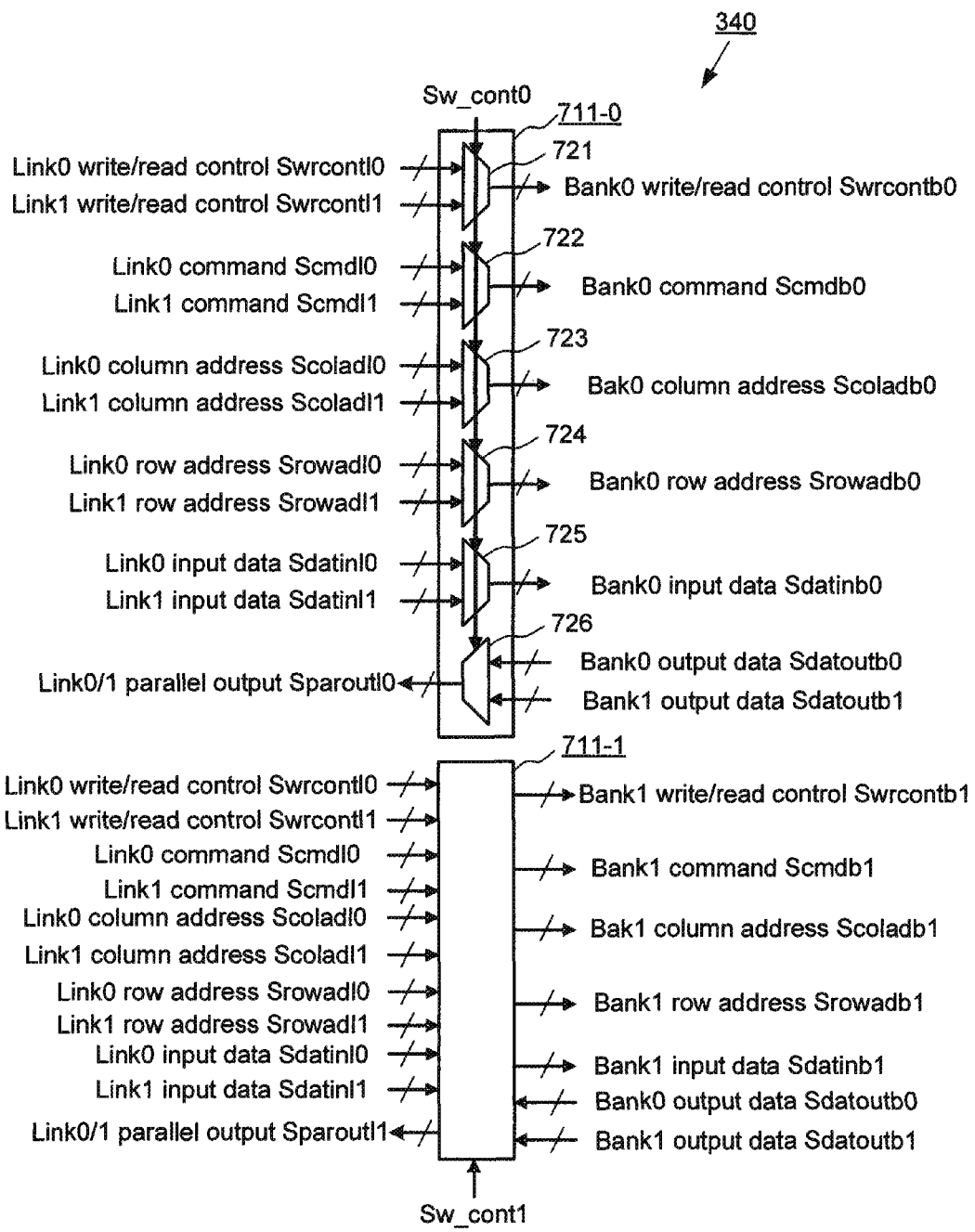
FIG. 18 is a block diagram of an example implementation of a link/bank switch circuit shown in FIG. 6.

FIG. 18 shows an example implementation of the link/bank switch circuitry 340 shown in FIG. 6. Each link can access any bank using this logic combination. That is to say, data received on either of the links can be written to either of the banks, and data output from either of the banks can be output from either of the links. Details of an example set of circuits that provide independent link and bank operation are described in commonly assigned co-pending U.S. application Ser. No. 11/643,850 filed Dec. 22, 2006 hereby incorporated by reference in its entirety. As detailed previously, the example of two-link and two-bank is implemented. Sw_cont0 and Sw_cont1 are a set of bank address control signals.

Referring now to FIGS. 6, 10, 11, 17 and 18, the link0 and link1 write/read control signals Swrcontl0 and Swrcontl1 are fed from the write/read controllers 543 of the link0 link1 I/O and data controllers 330-0 and 330-1, respectively, through the write/read control inputs Wr/Rdcont of the link/bank switch circuitry 340. The link0 and link1 command signals Scmdi0 and Scmdl1 are fed from the command interpreters 525 of the link0 link1 I/O and data controllers 330-0 and 330-1, respectively, through the command inputs Cmd of the link/bank switch circuitry 340. The link0 and link1 column address signals Scoladl0 and Scoladl1 are output from the column address registers 537 of the link0 link1 I/O and data controllers 330-0 and 330-1, respectively, through the column address inputs Colad of the link/bank switch circuitry 340. The link0 and link1 row address signals Srowadl0 and Srowadl1 are output from the row/bank address registers 539 of the link0 link1 I/O and data controllers 330-0 and 330-1, respectively, through the row address inputs Rowad of the link/bank switch circuitry 340. The link0 and link1 input data signals Sdatinl0 and Sdatinl1 are output from the data registers 519 of the link0 link1 I/O and data controllers 330-0 and 330-1, respectively, through the data inputs Datain of the link/bank switch circuitry 340.

The switch control signals "sw_cont0" and "sw_cont1" from the link0 I/O and data controller 330-0 and the link1 I/O and data controller 330-1 are fed to a bank0 switch 711-0 and a bank1 switch 711-1, respectively. In the particular example shown in FIG. 18, the switch 711-0 has six selectors 721-726. Similarly, the switch 711-1 has six selectors.

In the bank0 switch 711-0, the link0 write/read control signal Swrcontl0 and the link1 write/read control signal Swrcontl1 are fed to a first selector 721, which outputs a selected one as the bank0 write/read control signal Swrcontb0. The link0 command signal Scmdl0 and the link1 command signal Scmdl1 are fed to a second selector 722, which outputs a selected one as the bank0 command signal Scmdb0. The link0 column address signal Scoladl0 and the link1 column address signal Scoladl1 are fed to a third selector 723, which outputs a selected one as the bank0 column address signal Scoladb0. The link0 row address signal Srowadl0 and the link1 row address signal Srowadl1 are fed to a fourth selector 724, which outputs a selected one as the bank0 row address signal Srowadb0. The link0 input data signal Sdatinl0 and the link1 input data signal Sdatinl1 are fed to a fifth selector 725, which outputs a selected one as the bank0 input data signal Sdatinb0. The bank0 output data signal Sdatoutb0 and the bank1 output data signal Sdatoutb1 are fed to a sixth selector 726, which outputs a selected one as the link0/1 parallel output signal Sparoutl0 through the data output Dataout of the link/bank switch circuitry 340.

Similarly, in the bank1 switch 711-1, the link0 write/read control signal Swrcontl0 and the link1 write/read control signal Swrcontl1 are fed to a first selector, which outputs a selected one as the bank1 write/read control signal Swrcontb1. The link0 command signal Scmdl0 and the link1 command signal Scmdl1 are fed to a second selector, which outputs a selected one as the bank1 command signal Scmdb1. The link0 column address signal Scoladl0 and the link1 column address signal Scoladl1 are fed to a third selector, which outputs a selected one as the bank1 column address signal Scoladb1. The link0 row address signal Srowadl0 and the link1 row address signal Srowadl1 are fed to a fourth selector, which outputs a selected one as the bank1 row address signal Srowadb1. The link0 input data signal Sdatinl0 and the link1 input data signal Sdatinl1 are fed to a fifth selector, which outputs a selected one as the bank1 input data signal Sdatinb1. The bank0 output data signal Sdatoutb0 and the bank1 output data signal Sdatoutb1 are fed to a sixth selector, which outputs a selected one as the link0/1 parallel output signal Sparoutl1.

The link0 write/read control signal Swrcontl0 and the link1 write/read control signal Swrcontl1 are write and read control signals generated by the write/read controller 543 shown in FIG. 10. The control signals are used to make the core operations, for example, decoding start and y-address increment. The link0 command signal Scmdl0 and the link1 command signal Scmdl1 are for the bank controller (the bank0 and bank1 controllers 350-0, 350-1 shown in FIG. 6). After receiving the command, the bank controller determines what operation is going to start and prepare the relevant internal signals to active word line and sensing start. The link0 column address signal Scoladl0 and the link1 column address signal Scoladl1 are used for column addressing. The link0 row address signal Srowadl0 and the link1 row address signal Srowadl1 are for row addressing. The link0 input data signal Sdatinl0 and the link1 input data signal Sdatinl1 are used for program data to be written into the selected flash memory cell. The link0/1 parallel output signal Sparoutl0 and the link0/1 parallel output signal Sparoutl1 are used for data output of read operations.

Figure 19:
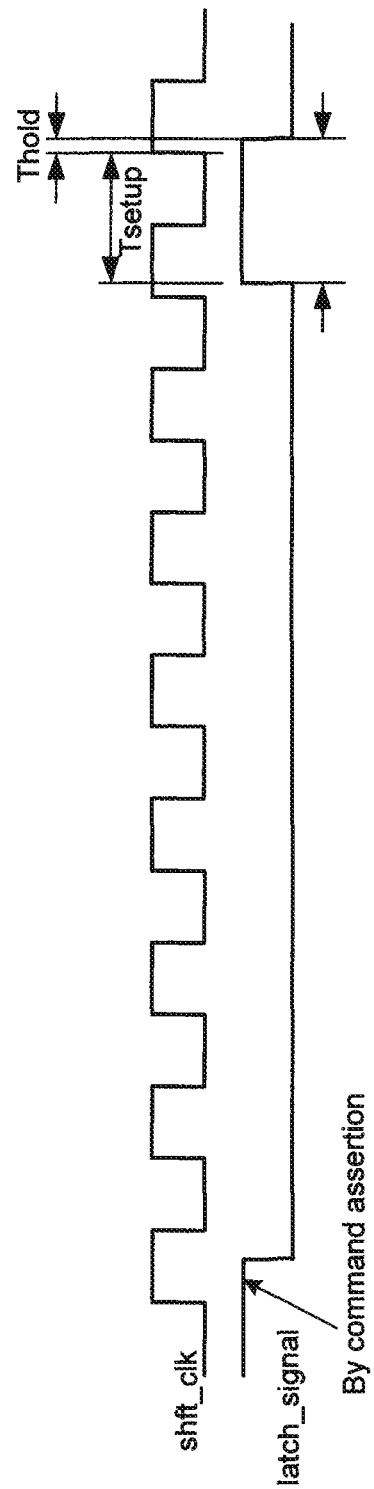
FIG. 19 illustrates timing diagrams of latch control generation for SDR operation.

As shown in FIG. 12 and described above, the setup and hold times can be provided with enough time margin because of clock based control generation. FIG. 19 shows how latch signals are made from the internal shift clock that is used in the register circuitry 320. Generally indicated is the timing for SDR operation. Timing mismatch does not occur due to the clock based latch control generation. The shift clock latches new input and then new parallel data is asserted during the high state of the latch signal which is caused by the shift clock. The latch signal goes to high after the rising edge of the clock signal for all operation condition. In FIG. 19, "Tsetup" indicates the setup time and "Thold" indicates the hold time.

Figure 20:
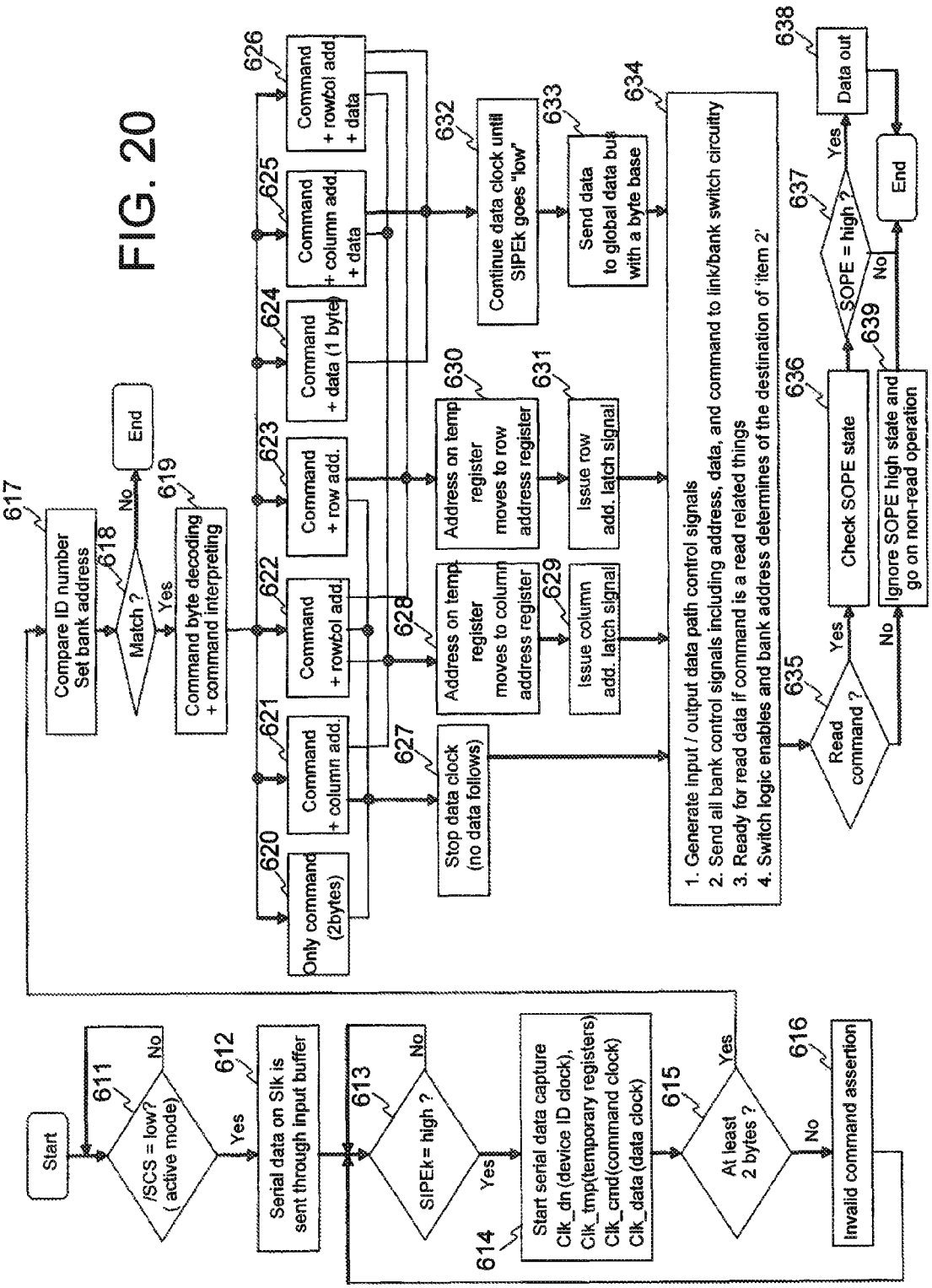
FIG. 20 is a flow chart of serial data processing in a single device.
Figure 21:
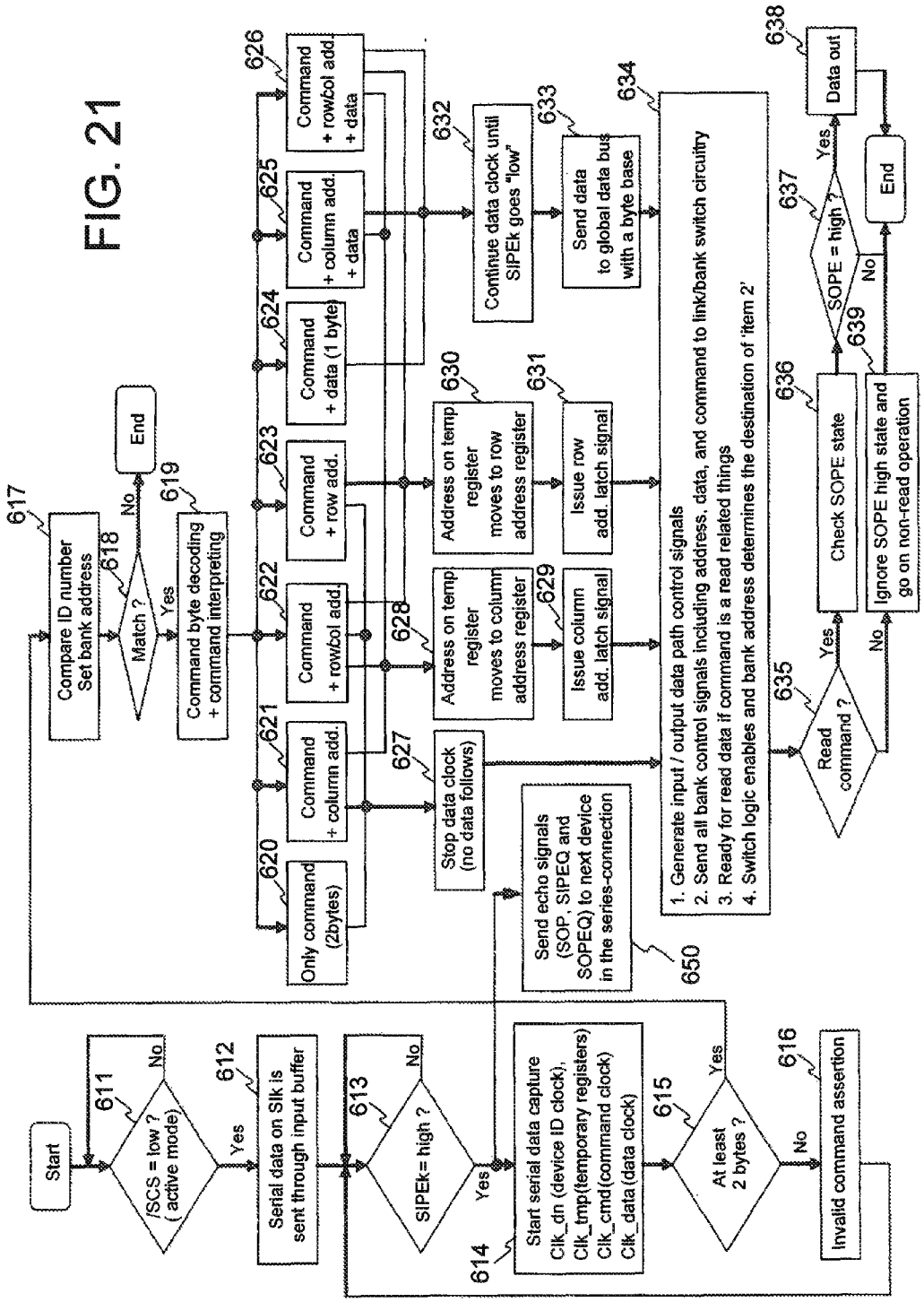
FIG. 21 is a flow chart of serial data processing in an interconnection configuration.

FIG. 20 is a flow chart of serial data processing when a device is operating in a single device configuration. FIG. 21 is a flow chart of serial data processing when a device is operating in an interconnection configuration. The difference between single device and the interconnection configuration is that the interconnection configuration's processing has an extra processing step 650 as shown in FIG. 21. In the extra processing step 650, all inputs from the serial input port SI, the input port enable input IPE, and the output port enable input OPE of the previous device (the j-th device) are transferred to the next device (the (j+1)-th device) through the serial output port SO, the input port enable echo output IPEQ, and the output port enable echo output OPEQ, respectively, with any determined latency (e.g., one cycle per one device, or half cycle per one device according to interface type, SDR or DDR). These transferred signals are referred to as "echo signals". If the asserted device ID number contained in the input command matches the device number (or the device address) stored in the ID number holder 521 (steps 617, 618), then the ID match signal goes "high" and the remainder of the steps of the flow chart (internal operations) are performed in that same device. While the internal operations are performed, the echo signals are sent to the next device (the (j+1)-th device) without interruption until the final device in the interconnection configuration takes these bits at the serial input port SI, the input port enable input IPE, the output port enable input OPE (from previous device, serial output port SO, input port enable echo output IPEQ, and output port enable echo output OPEQ are connected, respectively). Logically, two devices can not be selected at the same time due to the device ID number in the command bytes of the serial input signal SIPk except for the broadcasting command with FFh ID number when input port enable input IPE is asserted.

It is noted that consecutive command assertions with one cycle low state of the input port enable signal SIPE are allowed for the different device selection. Only the case that interconnection configuration can accept as a valid input for the simultaneous access of same device is to have two-port operation at the same time with different bank access and same device. In the case of all devices having different ID number from the asserted ID from the serial input port SI, the asserted command is not executed at all. Thus, the same link can not handle multiple commands consecutively if the same device is selected after completing the command transferring. If it happens, the previous operation would be terminated and new one would start again at the same device.

The minimum requirement to operate a device is to raise the input port enable signal SIPE to the high state (more generally an enable state) for as many cycles as the command bytes and followed address or/and data bytes. From this start point, the internal clocks to accept the ID number, command, address, and data are generated with different names shown in FIGS. 20 and 21. If the command bytes are less than two bytes in number, it would be considered as an invalid command without decoding. Clock generation and termination of each clock are determined by the command type and the length of data input bits other than clocks for ID and command that have fixed lengths which is defined in a given interconnection configuration specification. The byte length of ID and commands can be updated and modified according to the additional features and demand from users.

The examples described herein present the case of one byte ID and one byte command, but other ID and command sizes can alternatively be employed with appropriate modifications that would be apparent to one skilled in the art. If matching the asserted id to the stored id number occurs, as a next step, command decoding and sorting of the command are executed. This step also has the function of determining how many cycles the clocks for the temporary register and data register have. Along with this, depending on the command, row or/and column addresses follow the command. Row address latch control and column address latch control independently are generated as a function of the command type. The last data assertion is determined by the falling of input port enable signal SIPE.

While serial data capture is being done based on the above description, the internal control signals which are produced from the step of command sorting are issued according to the appropriate timing relations from the start of command decoding to the selection of bank by the bank address that is latched in the bank address register. From the bank address, the link to bank connection is carried out and all related signals including addresses and command itself are sent to bank control through switch logic. And then the memory operations are performed in the core block.

A detailed description of FIG. 20 will now be presented. FIG. 21 is the same except for the differences noted above. To begin, it is determined whether the chip select signal is high (step 611). When the chip select signal becomes "low", the serial data on Slk is sent through the input buffer (step 612). Thereafter, when input port enable signal SIPEk becomes high (Yes at step 613), serial data capture is started by generating the device ID clock, the temporary registration clock, the command clock and the data clock (step 614). If at least two bytes are not received (No at step 615), an command is considered to be invalid (step 616) and the method continues back at step 613.

Upon completion of at least two bytes (Yes at step 615), the ID number is compared and the bank address is set (step 617). If the received device ID does not match the device's stored device ID (negative determination at step 618), the process will end. In a case where they do match each other (positive determination at step 618), the command byte is decoded and the command is interpreted (step 619). Thereafter, one of several functions 620 to 626 is performed depending on the command:

(i) only command (two bytes), that is, one-byte ID number and one-byte OP code (step 620);
(ii) command and column address (step 621);
(iii) command and row/column addresses (step 622);
(iv) command and row address (step 623);
(v) command and data (one byte) (step 624);
(vi) command, column address and data (step 625);
(vii) command, row/column addresses and data (step 626).

In any one of steps 620, 621, 622 and 623, no data is contained in the command and the generation of the data clock is ceased (step 627). In any one of steps 621, 622, 625 and 626, the column address is contained in the command and the address held in the temporary registers 517 is moved to the column address register 537 (step 628). Then, the column address latch signal is issued (step 629). In any one of steps 622, 623 and 626, the row address is contained in the command and the address held in the temporary registers 517 is moved to the row/bank register 539 (step 630). Then, the row address latch signal is issued (step 631). In any one of steps 624, 625 and 626, the data is contained in the command and the generation of the data clock continues until the input port enable signal SIPEk transits "low" (step 632). Then, the data is sent to the global data bus in a byte basis (step 633). Upon completion of steps 627, 629, 632, and 633, the input/output data path control signals are generated (item 1, step 634). All bank control signals including address, data, and command are sent to the link/bank switch circuitry 340 (item 2, step 634). If the command has a read related function, it will be ready for data read (item 3, step 634). Furthermore, in step 634, item 4, the switch logic enables and bank address determines the destination of "step 634, Item 2".

If the command is a read related command (positive determination at step 635), the state of the output port enable signal SOPE is checked (step 636). If the output port enable signal SOPE is high (positive determination at step 637), the data will be output (step 638) and the process ends. If the state of the output port enable signal SOPE is not high (negative determination at step 637), the process will end. If the command is not a read related command (negative determination at step 635), the state of the output port enable signal SOPE will be ignored and non-read operation is performed (step 639) and the process ends.

In embodiments with clock based serial data capturing, a single clock iSCLK (used in the interconnection configuration) is used as a source clock and several internal clocks are created with this source clock. Depending on the command type, the number of cycles of some clocks is changed, but clocks for command and ID are fixed so that separated control can be done in the link I/O and data controller 330. Because of this, internal logic circuitry does not need to be updated when clock speed increases. As well, SDR and DDR interfaces are easily applied to this logic structure.

The example of the control interface circuitry 315 shown in FIG. 7 outputs the internal clock iSCLK based on the rising edge of input clocks for SDR mode operation. Alternatively, it outputs output clock for the DDR operation.

Figure 22:
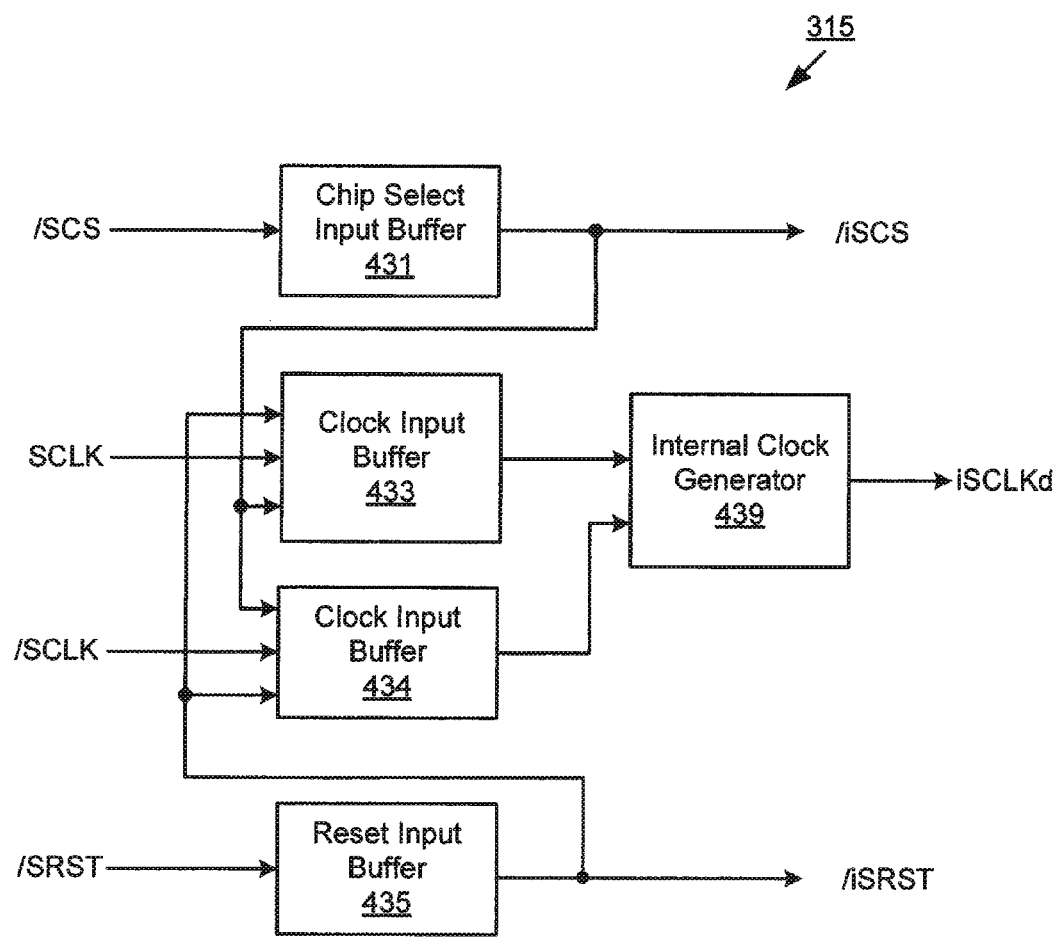
FIG. 22 is a block diagram of another example implementation of a control interface circuit.
Figure 23:
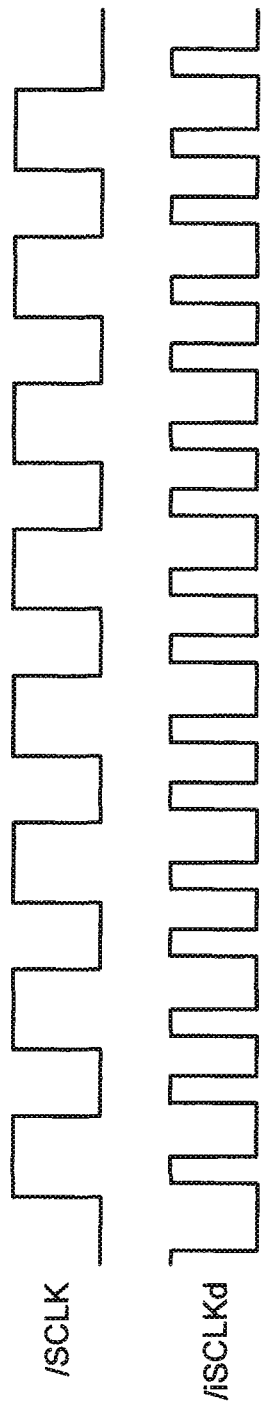
FIG. 23 illustrates a timing diagram of a DDR operation with a clock signal.

FIG. 22 shows another example implementation of the control interface circuit 315 shown in FIG. 6. Referring to FIG. 22, the control interface circuit includes another clock input buffer 434 that receives a complementary clock signal /SCLK, the internal chip select signal /iSCS and the internal reset signal /iSRST. An internal clock generator 439 makes the internal clock iSCLK based on the rising edge of the clock signal SCLK and the rising edge of the internal clock signal /SCLK. An example of the internal clock signal iSCLKd for the DDR operation is shown in FIG. 23.

Figure 24:
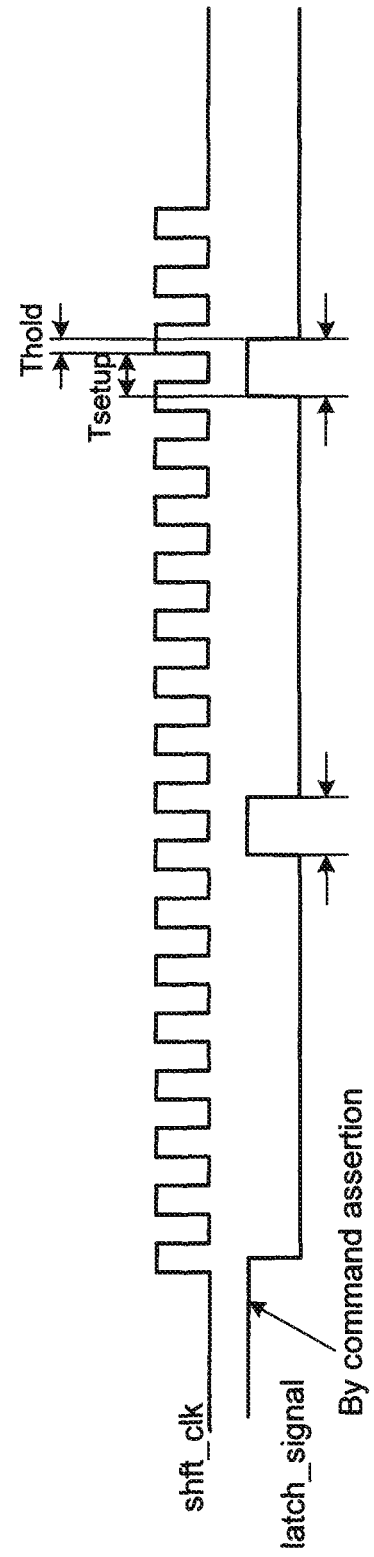
FIG. 24 illustrates a timing diagram of latch control generation for DDR operation.

FIG. 24 shows a timing diagram of latch control generation for DDR operation. Generally indicated is the timing for DDR operation. Timing mismatch does not occur due to the clock based latch control generation.

In some embodiments a fast read response time from parallel-to-serial output control register can be realized. When output port enable signal SOPE is asserted, output results of read operations are outputted with minimum delay from the register to the output buffer in a clock synchronized serial fashion. To make the delay shorter, for example, the parallel-to-serial registers 573 and 577 of the register circuitry 320 shown in FIG. 11 are placed near the output buffer. The output port enable input OPE and iSCLK combined output enable signal can be used to control parallel-to-serial shift operation without an additional pipe line step. This ensures a quick read response time and provides the high frequency operation. The other way to more enhance the internal read and write speed, 2n or 4n prefetch (not shown) can be used in the described device.

In the example shown in FIG. 1, the devices of the interconnection configuration receive the common clock SCLK. Another example of a system is that the clock from the memory controller is input to the first device which in turn provides an output clock to the second device. Then, the second device provides an output clock to the third device. In such system, the input clock to the first device is propagated through the devices of the interconnection configuration with or without a delay. Each of the devices may include a clock synchronization circuit that receives an input clock from a previous device and provides an output clock to a next device with a certain time delay. The clock synchronization circuit may include an internal delay circuit, such as, for example, PLL (phase-locked loop) and DLL (delay locked loop).

FIG. 3 can alternatively be referred to as a hybrid type of the interconnection configuration and the multi-drop, which takes advantage of both connection modes.

Some embodiments provide for flexible expansion of link logic for multiple link structures. This logic configuration provides more flexibility when the number of links needs to be increased for example to satisfy a system requirement. Switch logic can be updated to handle more than two links that have more than two banks as would be understood by a person skilled in the art. Other logic circuitry can be used directly without any change to the detailed connections into each block.

In the above-described embodiments and examples, the circuitry, circuits, logic gates, selectors are shown by representing single circuits or blocks, for the sake of simplicity. It would be apparent that such circuitry, circuits, logic gates, selectors may be comprised in accordance with their functions and input and output signals (e.g., the bit numbers of parallel signals or data bits).

In the embodiments described above, the device elements and circuits are connected to each other as shown in the figures, for the sake of simplicity. In practical applications of the present invention to data processing apparatus, devices, elements, circuits, etc. may be connected directly to each other. As well, devices, elements, circuits etc. may be connected indirectly to each other through other devices, elements, circuits, etc., necessary for operation of the data processing apparatus. Thus, in actual configuration of data processing apparatus, the circuit elements and devices are coupled with (directly or indirectly connected to) each other.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A memory device for use in a serial interconnection configuration comprising a plurality of memory devices connected in-series, each of the memory devices being addressable based on device identification (ID), the memory device comprising:
   a receiver configured to receive an input port enable signal, a serial input signal and an output port enable signal, the receiver comprising:
      a first input buffer configured to receive the input port enable signal and to provide an internal input enable signal;
      a second input buffer configured to receive the serial input signal and to provide an internal serial input signal; and
      a third input buffer configured to receive the output port enable signal and to provide an internal output enable signal; and
   an output provider configured to output a serial output signal, an echo of the input port enable signal and an echo of the output port enable signal, the output provider comprises:
      logic circuitry configured to
         receive the internal serial input signal and the internal input enable signal, and
         provide an input signal to a first flip-flop; and
      a selector configured to
         receive an output signal of the first flip-flop,
         receive an internal serial output signal,
         receive an ID match signal, and
         select the output signal from the first flip-flop when the ID match signal is de-asserted or select the internal serial output signal when the ID match signal is asserted.

2. The memory device of claim 1, wherein the selector is configured to provide the output signal from the first flip-flop or the internal serial output signal to a first output buffer.

3. The memory device of claim 2, wherein the first output buffer is configured to receive a selected signal from the selector and output the serial output signal.

4. The memory device of claim 2, wherein the first output buffer comprises a tri-state buffer configured to be enabled by a chip select signal.

5. The memory device of claim 1, wherein the output provider further comprises:
   a second flip-flop configured to receive the internal input enable signal and provide an input signal to a second output buffer; and
   a third flip-flop configured to receive the internal output enable signal and provide an input signal to a third output buffer.

6. The memory device of claim 5, wherein the first, second, and third flip-flops are configured to receive an internal clock signal.

7. The memory device of claim 5, wherein the third output buffer is configured to output the echo of the output port enable signal.

8. The memory device of claim 1, wherein the second output buffer is configured to output the echo of the input port enable signal.

9. The memory device of claim 1, wherein the output provider further comprises:
   a first output buffer configured to output the serial output signal;
   a second output buffer configured to output the echo of the input port enable signal; and
   a third input buffer configured to output the echo of the output port enable signal.

10. The memory device of claim 9, wherein the first output buffer of the output provider comprises a tri-state buffer configured to be enabled by a chip select signal.

11. The memory device of claim 9, wherein the output provider further comprises:
    a second flip-flop configured to receive an internal input enable signal and provide an input signal to the second output buffer; and
    a third flip-flop configured to receive an internal output enable signal and provide an input signal to the third output buffer.

12. The memory device of claim 11, wherein the second input buffer is switchable by a chip select signal.

13. The memory device of claim 11, wherein the third input buffer is switchable by a chip select signal.

14. The memory device of claim 11, wherein the logic circuitry comprises an AND gate for logically combining the internal serial input signal; and the internal output enable signal.

15. The memory device of claim 1, wherein the logic circuitry further comprises an AND gate for logically combining the internal serial input signal; and the internal output enable signal.

* * * * *